(12) United States Patent
Lei et al.

(10) Patent No.: US 12,382,474 B2
(45) Date of Patent: Aug. 5, 2025

(54) SPATIAL DIVISION MULTIPLEXING FOR REDUCED CAPABILITY WIRELESS DEVICES

(71) Applicant: QUALCOMM Incorporated, San Diego, CA (US)

(72) Inventors: Jing Lei, San Diego, CA (US); Alexandros Manolakos, Escondido, CA (US); Chao Wei, Beijing (CN); Huilin Xu, Temecula, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 17/802,059

(22) PCT Filed: Feb. 28, 2020

(86) PCT No.: PCT/CN2020/077141
§ 371 (c)(1),
(2) Date: Aug. 24, 2022

(87) PCT Pub. No.: WO2021/168778
PCT Pub. Date: Sep. 2, 2021

(65) Prior Publication Data
US 2023/0117080 A1    Apr. 20, 2023

(51) Int. Cl.
*H04W 72/232* (2023.01)
*H04L 5/00* (2006.01)

(52) U.S. Cl.
CPC ......... *H04W 72/232* (2023.01); *H04L 5/0051* (2013.01); *H04L 5/0053* (2013.01); *H04L 5/0094* (2013.01)

(58) Field of Classification Search
CPC .. H04W 72/232; H04L 5/0051; H04L 5/0053; H04L 5/0094; H04L 5/0012;
(Continued)

(56) References Cited

U.S. PATENT DOCUMENTS

2013/0107835 A1* 5/2013 Aiba ................ H04L 5/001
370/329
2014/0044070 A1* 2/2014 Chen ............... H04L 5/0037
370/329
(Continued)

FOREIGN PATENT DOCUMENTS

| CN | 110519843 A | 11/2019 |
|---|---|---|
| EP | 2916607 A1 | 9/2015 |
| WO | 2018172987 A1 | 9/2018 |

OTHER PUBLICATIONS

MCC Support: "Final Report of 3GPP TSG RAN WG1 #94 v1.0.0 (Gothenburg, Sweden, Aug. 20-24, 2018)", 3GPP TSG RAN WG1 Meeting #94bis, R1-1810051, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, pp. 1-194, Oct. 4, 2018, XP051517464, pp. 41, 88.
(Continued)

Primary Examiner — Kiet Tang
(74) Attorney, Agent, or Firm — Procopio, Cory, Hargreaves & Savitch LLP

(57) ABSTRACT

A user equipment (UE) receives information for a physical downlink control channel (PDCCH) or a physical downlink shared channel (PDSCH), where the PDCCH/PDSCH are broadcast or group-cast from a base station and have a quasi co-location relationship with a synchronization signal/PBCH (SSB) block or a channel state information reference signal (CSI-RS) beam. The UE monitors for or receives the PDCCH/PDSCH based on at least one of a search space (SS) set configuration enhancement for the PDCCH, a demodulation reference signal (DM-RS) resource configuration enhancement for the PDCCH or the PDSCH, or a scrambling identifier set enhancement for payload bits of the PDCCH or the PDSCH, which support the spatial division
(Continued)

multiplexing (SDM) with another PDCCH/PDSCH that are broadcast or group-cast from the same base station and have the quasi co-location relationship with a different SSB block or a different CSI-RS beam.

32 Claims, 11 Drawing Sheets

(58) Field of Classification Search
CPC ... H04L 5/0044; H04L 1/0046; H04L 5/0037; H04L 5/001
See application file for complete search history.

(56) References Cited

U.S. PATENT DOCUMENTS

| | | | |
|---|---|---|---|
| 2015/0223210 A1 | 8/2015 | Guo et al. | |
| 2016/0205571 A1* | 7/2016 | Yi | H04L 5/0055 370/252 |
| 2020/0037293 A1 | 1/2020 | Reial et al. | |
| 2020/0221428 A1* | 7/2020 | Moon | H04L 1/0046 |

OTHER PUBLICATIONS

Supplementary European Search Report—EP20921626—Search Authority—The Hague—Nov. 8, 2023.
Intel Corporation: "Discussion on Definition of QCL for RRM Requirements", 3GPP TSG-RAN WG4 Meeting #92bis, R4-1911015, Chongqing, China, Oct. 14-18, 2019, Apr. 12, 2019 (Apr. 12, 2019) The Whole Document, 3 Pgs.
International Search Report and Written Opinion—PCT/CN2020/077141—ISA/EPO—Nov. 26, 2020.
LG Electronics: "Discussion on UE Behavior on Reception of Channels or RS in the Same OFDM Symbol", 3GPP TSG-RAN WG4 Meeting #90BIS, R4-1903418, Xian, China, Apr. 8-12, 2019, Apr. 12, 2019 (Apr. 12, 2019) Section 2, 3 Pages.

* cited by examiner

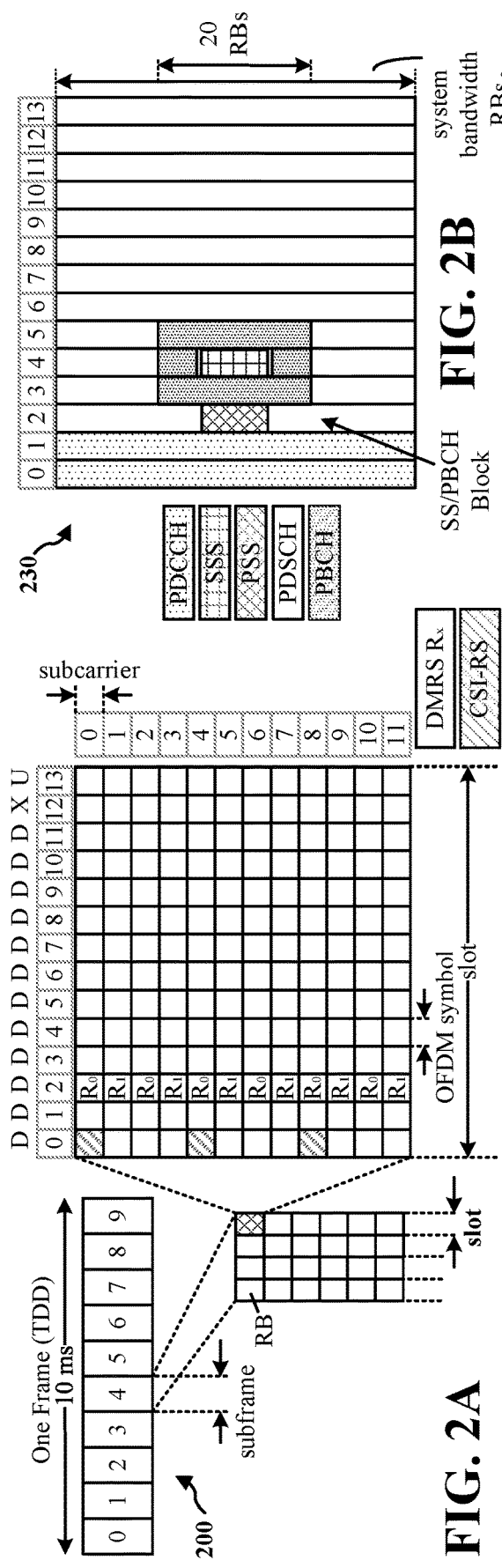
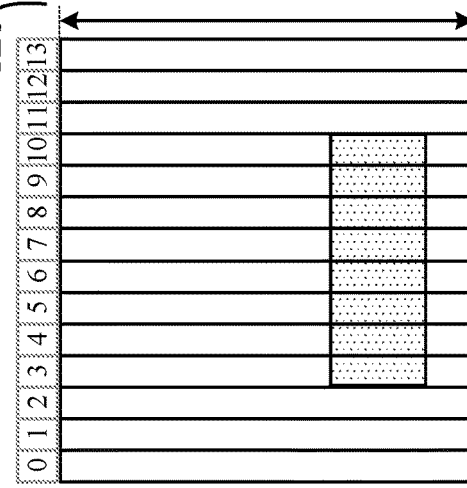
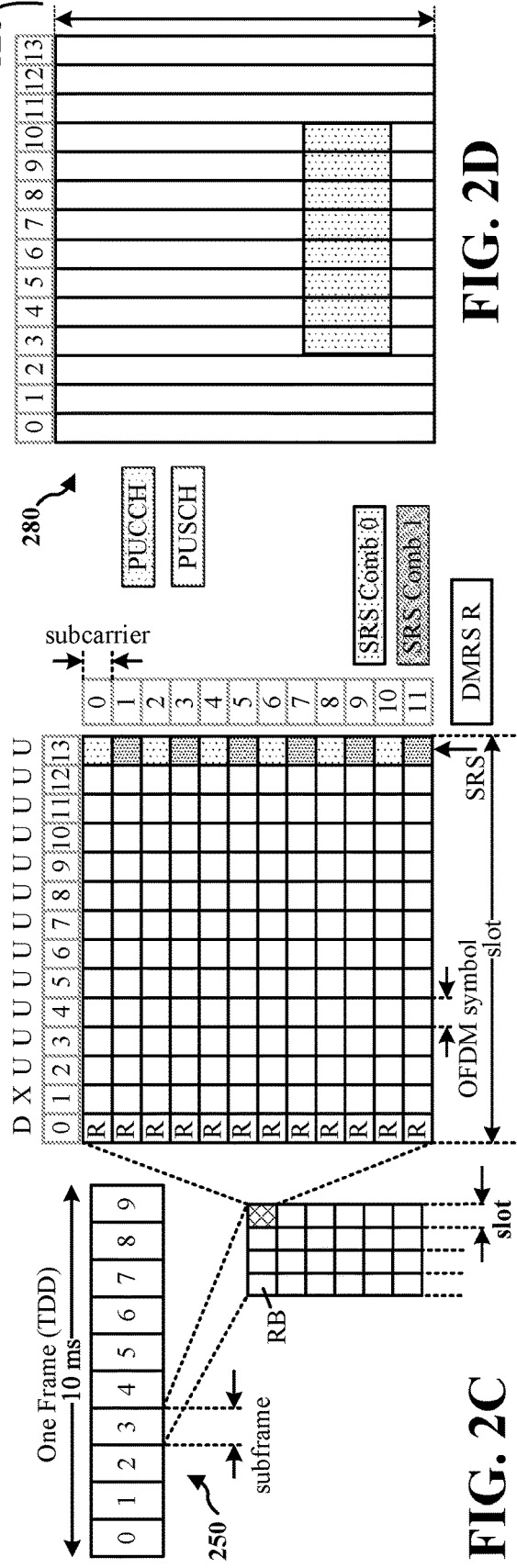
FIG. 2A  FIG. 2B  FIG. 2C  FIG. 2D

SPATIAL DIVISION MULTIPLEXING FOR REDUCED CAPABILITY WIRELESS DEVICES

CROSS REFERENCE TO RELATED APPLICATION(S)

This application is National Stage Application filed under 35 U.S.C. § 371 of PCT International Application No. PCT/CN2020/077141, entitled "SPATIAL DIVISION MULTIPLEXING FOR REDUCED CAPABILITY WIRELESS DEVICES" and filed Feb. 28, 2020, which is expressly incorporated by reference herein in its entirety.

BACKGROUND

Technical Field

The present disclosure relates generally to communication systems, and more particularly, to wireless communication including spatial division multiplexing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives information for a physical downlink control channel (PDCCH) or a physical downlink shared channel (PDSCH), where the PDCCH or the PDSCH are broadcast or group-cast from a base station and have a quasi co-location (QCL) relationship with a synchronization signal/PBCH (SSB) block or a channel state information reference signal (CSI-RS) beam. The apparatus monitors for or receives the PDCCH or the PDSCH based on at least one of a search space (SS) set configuration enhancement for the PDCCH, a demodulation reference signal (DM-RS) resource configuration enhancement for the PDCCH or the PDSCH, or a scrambling identifier set enhancement for payload bits of the PDCCH or the PDSCH, which support spatial division multiplexing (SDM) with another PDCCH or another PDSCH that are broadcast or group-cast from the base station and have the quasi co-location relationship with a different SSB block or a different CSI-RS beam.

In an aspect of the disclosure, a method, a computer-readable medium, and an apparatus are provided for wireless communication at a base station. The apparatus transmits information for a PDCCH or a PDSCH, where the PDCCH or the PDSCH are broadcast or group-cast from the base station and have a QCL relationship with an SSB block or a CSI-RS beam. The apparatus broadcasts or groupcasts the PDCCH or the PDSCH based on at least one of a SS set configuration enhancement for the PDCCH, a DM-RS resource configuration enhancement for the PDCCH or the PDSCH, or a scrambling identifier set enhancement for payload bits of the PDCCH or the PDSCH, which support the SDM with another PDCCH or another PDSCH that are broadcast or group-cast from the same base station and have the quasi co-location relationship with a different SSB block or a different CSI-RS beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
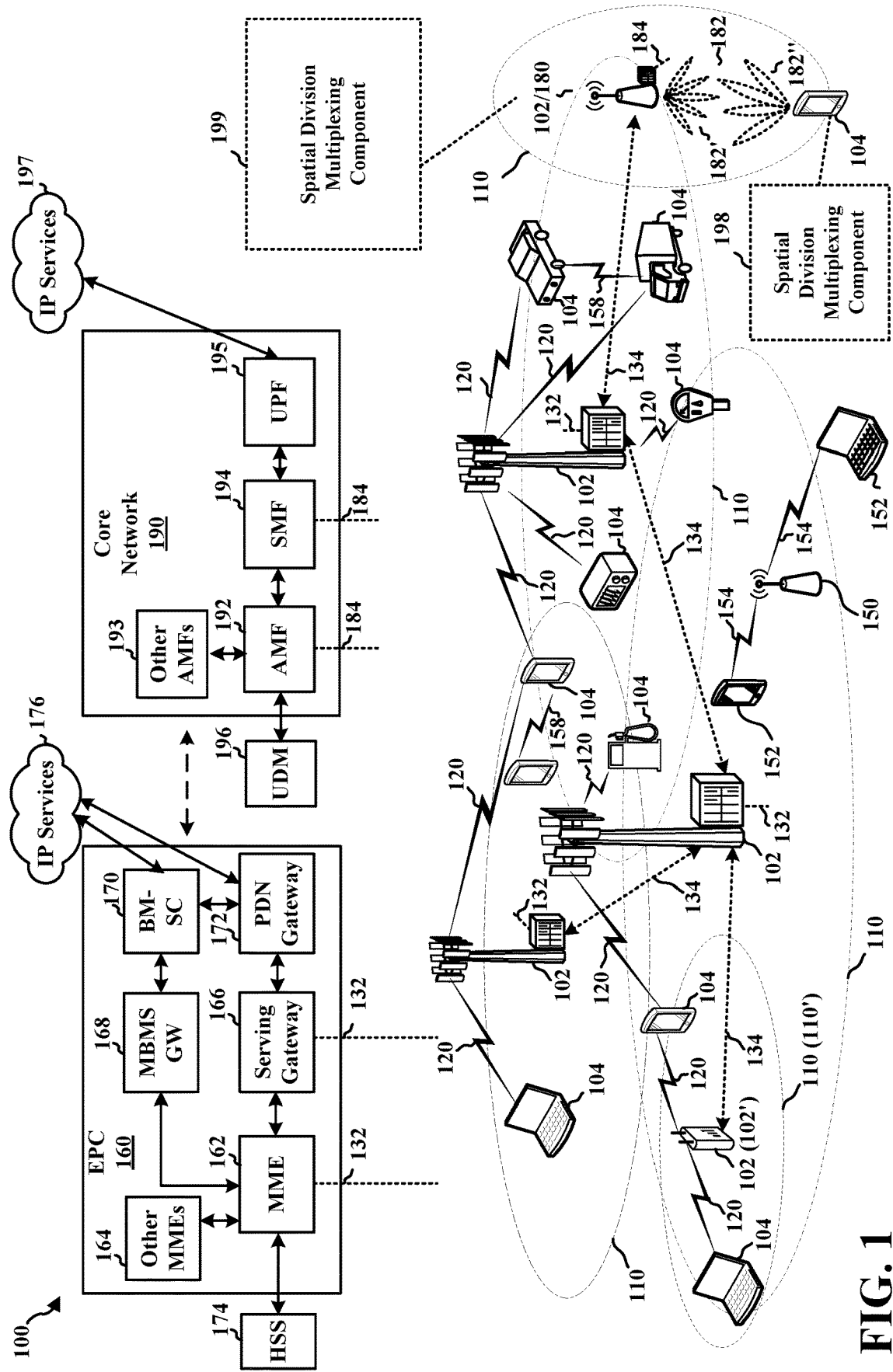
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a spatial division multiplexing component 198 configured to monitor for or receive a PDCCH or a PDSCH based on a SS set, a DM-RS, and/or scrambling that supports SDM of the PDCCH or the PDSCH, as described herein. The base station 102 or 180 may include a spatial division multiplexing component 199 configured to transmit a PDCCH or a PDSCH based on a SS set, a DM-RS, and/or scrambling that supports SDM of the PDCCH or the PDSCH, as described herein. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
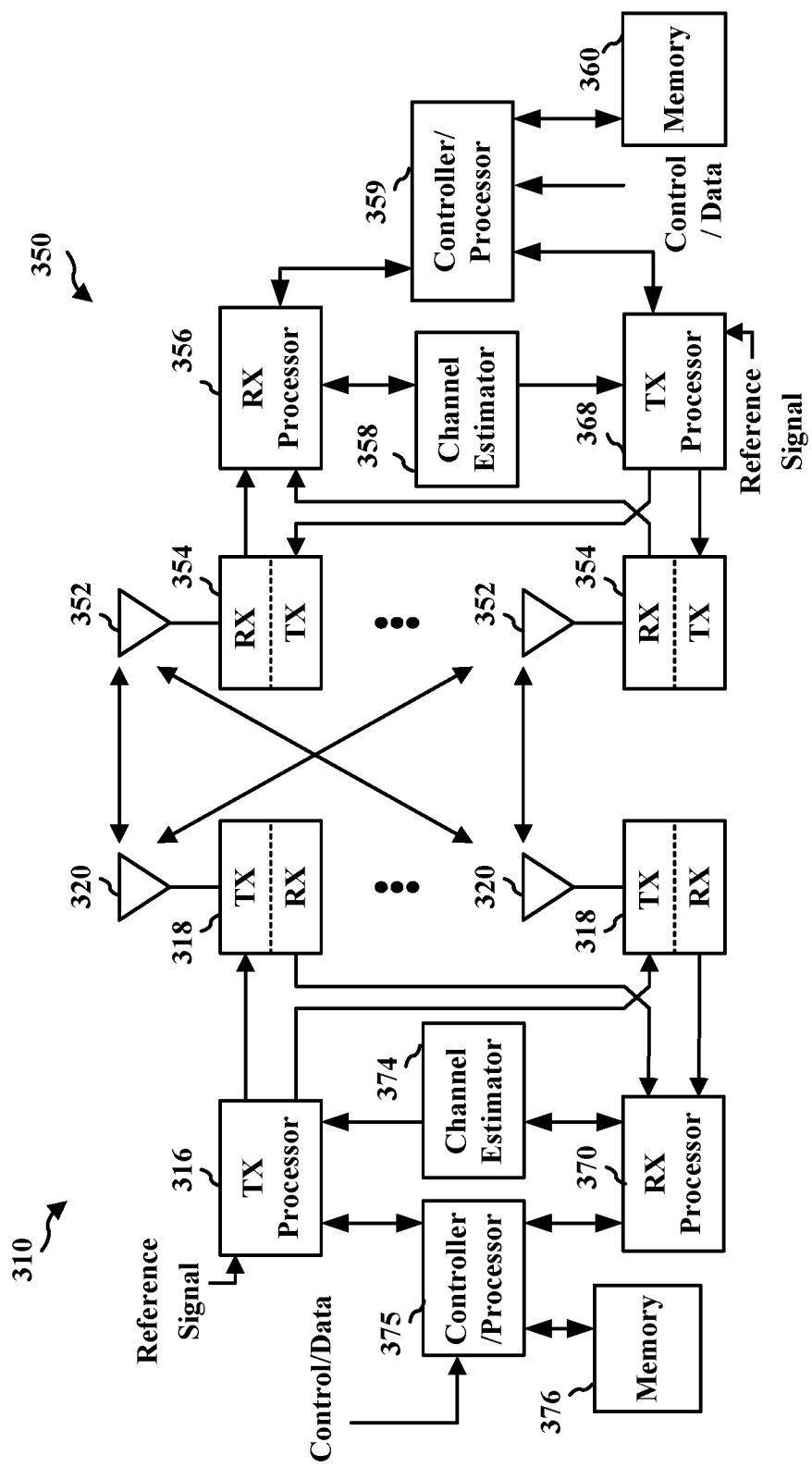
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
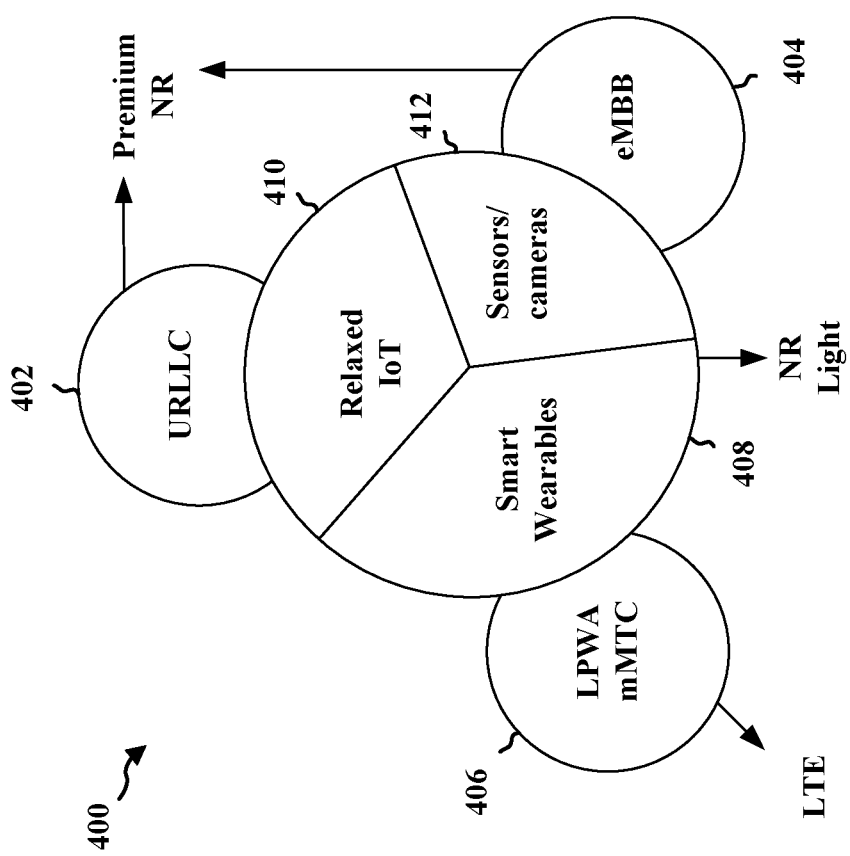
FIG. 4 is a diagram illustrating aspects of communication for reduced capability devices.

In addition to higher capability devices wireless communication may support reduced capability devices. Among others, examples of higher capability devices include premium smartphones, V2X devices, URLLC devices, eMBB devices, etc. Among other examples, reduced capability devices may include wearables, industrial wireless sensor networks (IWSN), surveillance cameras, low-end smartphones, etc. For example, NR communication systems may support both higher capability devices and reduced capability devices. A reduced capability device may be referred to here as an "NR light" device. FIG. 4 illustrates an example 400 showing example communication, such as URLLC 402, eMBB 404, and low power wide area (LPWA) and mMTC 406 and examples of corresponding reduced capability devices that may use such communication. For example, smart wearables 408 may use LWPA/mMTC 406; relaxed IoT devices 410 may use URLLC 402, and sensors/cameras 412 may use eMBB 404.

It may be helpful for communication to be scalable and deployable in a more efficient and cost effective way. For example, it may be possible to relax or reduce peak throughput, latency, and/or reliability requirements for reduced capability devices. Instead, in some examples, it may be more important to provide greater efficiency in communication that reduces power consumption and/or system overhead. In some examples, it may be more important to make cost improvements that enable less complex devices to communicate in the system.

In order to achieve greater efficiency and/or cost reduction, the reduced capability devices may communicate using a reduced bandwidth and/or may include a reduced number of antennas (e.g., reception antennas). However, the reduced bandwidth and reduced number of antennas may reduce downlink coverage and downlink coverage recovery.

Transmission schemes be employed to compensate for the loss of downlink coverage due to the reduced bandwidth and/or reduced number of antennas. In some examples, the transmission scheme may include repetitions (with or without frequency hopping) to improve the downlink coverage. In some examples, the transmission scheme may include TBS and/or MCS scaling to provide a smaller TBS and/or lower MCS to improve the downlink coverage. In some examples, the transmission scheme may include DMRS bundling that uses DMRS repetitions in a slot or multiple slots to improve channel estimation in order to improve the downlink coverage. However, such transmission schemes may improve the downlink coverage at the cost of reduced capacity or throughput, e.g., by using additional wireless resources.

Aspects presented herein provide an improved balance of coverage and capacity/throughput through more efficient spatial division multiplexing (SDM) schemes for PDCCH/PDSCH transmissions for reduced capability devices. The aspects presented herein support improved coverage while making an efficient use of wireless resources.

Aspects presented herein provide example transmission schemes and signaling to support SDM of broadcasting/group-casting PDCCH and/or PDSCH, including. Aspects may include enhancements of search space (SS) set configurations. Aspects may include DMRS enhancements for group common PDCCH (GC-PDCCH), e.g., in Type 0/0A/1/2 SS sets. Aspects may include DMRS enhancement for PDSCH carrying SIB/random access response (RAR). Aspects may include scrambling a payload of a GC-PDCCH and broadcasting or groupcasting PDSCH.

SS Set Configuration

A PDCCH search space refers to time and frequency resources in which a PDCCH may be carried. A UE may monitor the search space and attempt to receive PDCCH in the search space. One example of a search space is Type-0 PDCCH, which is a common search space that the UE may use to decode SIB, etc. In NR, a 4-bit information element (IE) may be provided in a master information block (MIB) to provide information for SS zero, e.g., "searchSpaceZero", which may point to a set of parameters for Type-0 PDCCH monitoring occasions in a 16-entry table. An example of such a 16-entry table with parameters for PDCCH monitoring occasions for Type-0 PDCCH SS is illustrated as Table 1. In the Table, M represents a parameter related to the number of SS sets configured per slot; and 0 represents a slot-level offset of the first PDCCH monitoring occasion, e.g., relative to the start of the radio frame.

TABLE 1

| Index | O | Number of search space sets per slot | M | First symbol index |
|---|---|---|---|---|
| 0 | 0 | 1 | 1 | 0 |
| 1 | 0 | 2 | 1/2 | {0, if i is even}, { $N_{symb}^{CORESET}$, if i is odd} |
| 2 | 2 | 1 | 1 | 0 |
| 3 | 2 | 2 | 1/2 | {0, if i is even}, { $N_{symb}^{CORESET}$, if i is odd} |
| 4 | 5 | 1 | 1 | 0 |
| 5 | 5 | 2 | 1/2 | {0, if i is even}, { $N_{symb}^{CORESET}$, if i is odd} |
| 6 | 7 | 1 | 1 | 0 |

TABLE 1-continued

| Index | O | Number of search space sets per slot | M | First symbol index |
|---|---|---|---|---|
| 7 | 7 | 2 | 1/2 | {0, if i is even}, { $N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

Not all rows in the Table 1 may be suitable for intra-slot or inter-slot repetition of PDCCH, because the number of SS sets per slot is 1 or 2, and the UE assumes port 2000 for PDCCH.

As presented herein, new configurations may be included in the SS set configuration table for Type-0 PDCCH monitoring.

In a first example, the new configurations for SS set configurations for Type-0 PDCCH monitoring for reduced capability devices (e.g., NR light devices) may be combined together with the other configurations for higher capability devices in a combined table. For example, the new configurations may be added to Table 1. For example, $2^Q$-16 new configurations may be added to Table 1. Q may represent an integer number for which 4<Q≤6. Thus, Q may be 5 or 6. Q bits may be mapped to a PBCH. The PBCH may carry minimum system information (MSI), which may include bits of a MIB comprising information form a MAC layer and a bits of a PHY payload. The Q bits may be included in the MIB, e.g., may be broadcast by the base station in a MIB. The Q bits may be included in the MIB and additional information added to the PBCH by the physical (PHY) layer bits. For example, the Q bits may be mapped to the MAC layer information or the PHY layer information of a PBCH.

Alternately or additionally, the new SS set configurations for Type-0 PDCCH monitoring may be provided in a separate table for reduced capability devices (e.g., NR light devices), e.g., in a different table than Table 1. The new table may include $2^N$ configurations. N may represent an integer for which 3≤N≤6, e.g., N may be 3, 4, 5, or 6. N bits may be mapped to the PBCH. The N bits may be included in the bits of the MIB, e.g., may be broadcast by the base station in a MIB. The N bits may be included in the bits of the MIB and additional information added by the bits of the physical (PHY) layer. For example, the N bits may be mapped to the MAC layer information or the PHY layer information of a PBCH.

In some examples, additional SS set configurations and/or SS set tables can be provided for Frequency Range 1 (FR1) between 410 MHz-7125 MHz and/or for Frequency Range 2 (FR2) between 24.25 GHz-52.6 GHz. In some examples, different multiplexing patterns may be provided between SSB and CORESET 0.

In addition to the parameters shown as examples in Table 1, e.g., {O, number of SS sets per slot, M, first symbol index}, additional parameters can be added to the new configurations.

For example, the SS set table may include a parameter for a repetition level that indicates a repetition level for the PDCCH. For example 1 or 2 bits may be used to indicate the repetition level of the PDCCH.

Additionally or alternatively, the SS set table may include a parameter for a flag or other indicator that indicates whether the repetition is intra-slot or inter-slot repetition. For example, a single bit may be used to indicate the type of repetition.

Additionally or alternatively, the SS set table may include a parameter for indicating whether frequency hopping is enabled or disabled for the PDCCH. For example, a single bit may be used to flag or indicate whether frequency hopping is enabled or disabled for the PDCCH.

Such configurations for, e.g., repetition level, repetition flag, frequency hopping flag, number of SS sets per slot, M, first symbol index, etc., may support one or more of intra-slot or inter-slot repetition for Type-0 PDCCH, intra-slot or inter-slot frequency hopping for Type-0 PDCCH, multiple SS sets per slot (2 or more SS sets per slot), and/or the index of the first symbol for SS set being quasi-co-located (QCL) with adjacent SSB block indexes that can be aligned or time-staggered.

DM-RS Enhancement for GC-PDCCH

In some examples, the PDCCH may be limited to transmission from antenna port 2000. For PDCCH that is QCL with different SSB indexes, the same DM-RS scrambling ID may be used. The transmission from the same antenna port with the same DM-RS scrambling ID does not enable a GC-PDCCH use SDM. Aspects presented herein enable SDM or code division multiplexing (CDM) of the GC-PDCCH.

Figure 5:
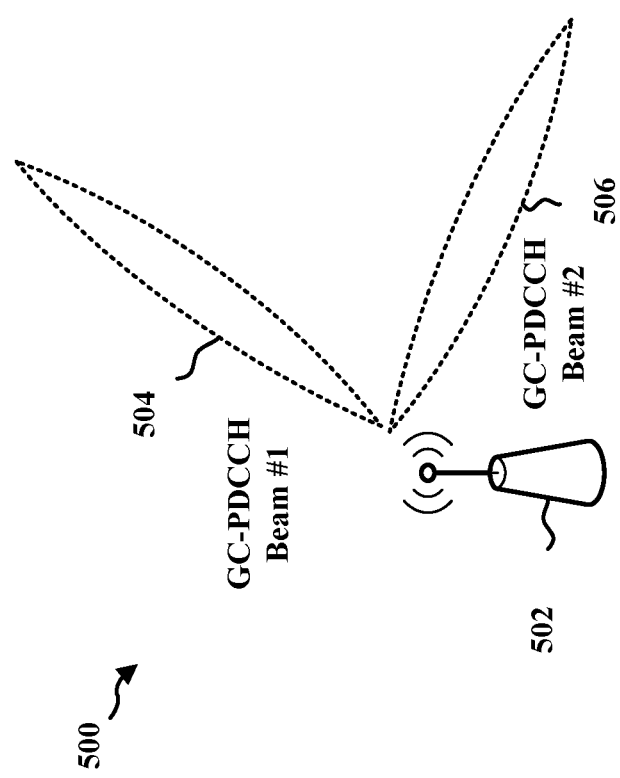
FIG. 5 is an example of multiplexing group-common physical downlink control channel (GC-PDCCH) transmissions using SDM.

FIG. 5 illustrates an example 500 of SDM transmission by a base station 502 of multiple GC-PDCCH beams (e.g., GC-PDCCH beam 504 and GC-PDCCH beam 506) that may be transmitted using the same or overlapping time/frequency resources. The GC-PDCCH that is transmitted on beam 504 may have a QCL relationship with SSB block of CSI-RS $B_1$, with $B_1$ being an index of the SSB block or CSI-RS. The base station 502 may transmit the GC-PDCCH on beam 504 using DM-RS port 2000. The base station 502 may transmit the GC-PDCCH on beam 504 using inter-slot or intra-slot repetition and/or frequency hopping. The base station 502 may transmit the GC-PDCCH on beam 504 using a DM-RS sequence scrambling ID that is a function of the SSB block index or the CSI-RS index (e.g., $B_1$).

The GC-PDCCH that is transmitted on beam 506 may have a QCL relationship with SSB block of CSI-RS $B_2$, with $B_2$ being an index of the SSB block or CSI-RS. The base station 502 may transmit the GC-PDCCH on beam 506 using DM-RS port 2001. DM-RS port 2001 may be orthogonal to DM-RS port 2000 or quasi-orthogonal with respect to DM-RS port 2000. The base station 502 may transmit the GC-PDCCH on beam 506 using inter-slot or intra-slot repetition and/or frequency hopping. The base station 502 may transmit the GC-PDCCH on beam 506 using a DM-RS sequence scrambling ID that is a function of the SSB block index or the CSI-RS index (e.g., $B_2$).

Figure 6:
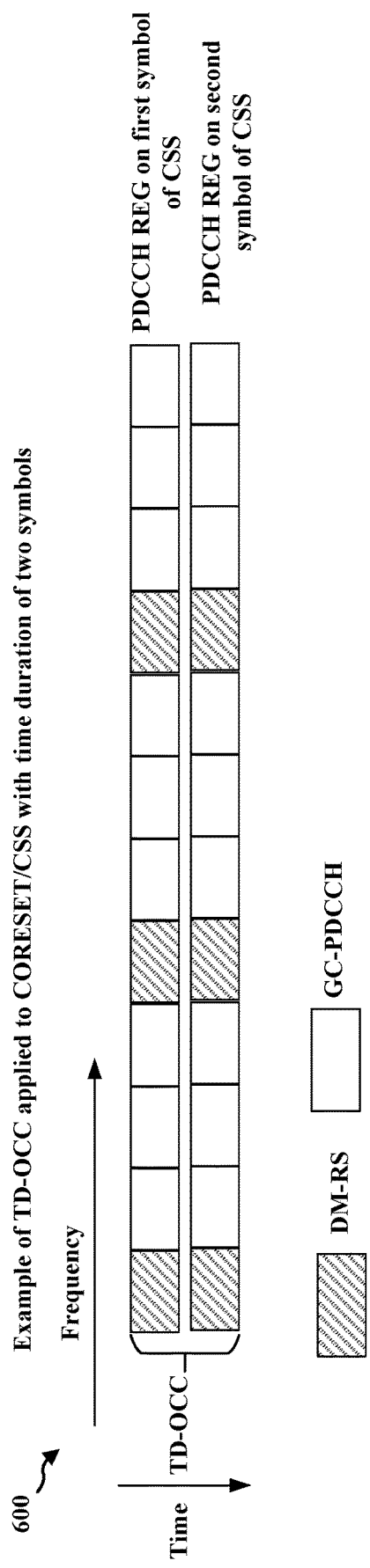
FIG. 6 is an example of group-common physical downlink control channel (GC-PDCCH) transmissions using time division orthogonal cover code (TD-OCC) and frequency division orthogonal cover code (FD-OCC).
Figure 6:
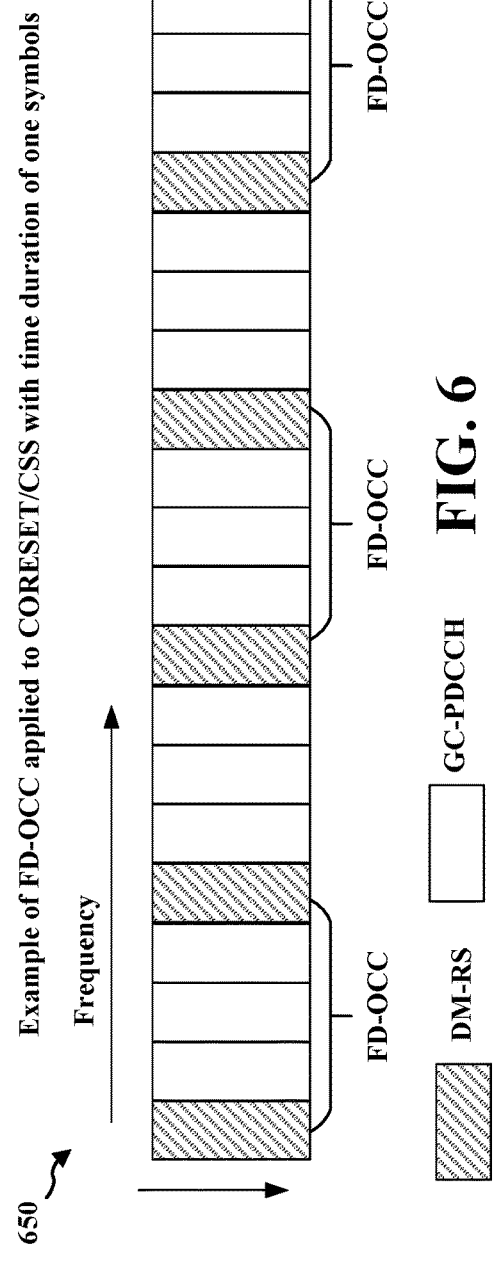

In some examples, the DM-RS of the GC-PDCCH that are QCL with different SSB indexes may use a frequency division orthogonal cover code (FD-OCC) and/or a time division orthogonal cover code (TD-OCC). FIG. 6 illustrates an example 600 using TD-OCC applied to a CORESET/CSS with a time duration of two symbols and an example 650 using FD-OCC applied to a CORESET/CSS with a time duration of one symbol. The base station may select between using the FD-OCC and/or the TD-OCC based on a CORESET duration, for example. As an example, when the CORESET duration is a single symbol, the base station may use FD-OCC for the DM-RS of the GC-PDCCH that are QCL with different SSB indexes. When the CORESET duration is more than a single symbol, the base station may use FD-OCC and/or TD-OCC for the DM-RS of the GC-PDCCH that are QCL with different SSB indexes. This example enables the GC-PDCCH to be transmitted using orthogonal antenna ports Additionally or alternately, the base station may determine the scrambling ID of the DM-RS for the GC-PDCCH based, at least in part, on an SSB index (e.g., the SSB index QCL with the GC-PDCCH). This example enables a CDM for the GC-PDCCH and enables a UE to differentiate between GC-PDCCHs based on the scrambling ID for the DM-RS.

A PDCCH scrambling ID (e.g., Cinit) may be based on, e.g.:

$$c_{init}=(2^{17}(N_{symb}^{slot} n_{s,f}^{\mu}+l+1)(2N_{ID}+1)+2N_{ID}) \bmod 2^{31}$$

where l is the OFDM symbol number within the slot, $n_{s,f}^{\mu}$ is the slot number within a frame, and
$N_{ID} \in \{0, 1, \ldots, 65535\}$ is given by the higher-layer parameter pdcch-DMRS-Scrambling ID if provided $N_{ID}=N_{ID}^{cell}$ otherwise.|

A PBCH scrambling ID may be based on, e.g.:

$$c_{init}=2^{11}(\bar{i}_{SSB}+1)(\lfloor N_{ID}^{cell}/4 \rfloor+1)+2^{\mu}(\bar{i}_{SSB}+1)-(N_{ID}^{cell} \bmod 4)$$

where
for $\bar{L}_{SSB}$, $\bar{i}_{SSB}=i_{SSB}+4n_{hf}$ where $n_{hf}$ is the number of the half-frame in which the PBCH is transmitted in a frame with $n_{hf}=0$ for the first half-frame in the frame and $n_{hf}=1$ for the second half-frame in the frame, and $i_{SSB}$ is the two lease significant bits of the candidate SS/PBCH block index
for $\bar{L}_{max}>4$, $\bar{i}_{SSB}=i_{SSB}$ where $i_{SSB}$ is the three least significant bits of the candidate SS/PBCH block index as In an example, the base station may use the DM-RS scrambling ID of a QCL'ed PBCH, e.g., so that $C_{init,PDCCH}=C_{init,PBCH}$. In this example, $C_{init,PDCCH}$ is the scrambling ID for the GC-PDCCH and $C_{init,PBCH}$ is the scrambling ID for the PBCH.

In another example, the base station may replacing the $N_{ID}$ term of $C_{init,PDCCH}$ by $C_{init,PBCH}$. Thus, rather than using the scrambling ID of the PBCH, the base station may determine the scrambling ID for the GC-PDCCH based, in part, on a parameter used to determine the scrambling ID for the PBCH>

In another example, the base station may use a new $C_{init,PDCCH}$ that is based on a weighted combination of the SSB index, the slot index and the cell ID for the GC-PDCCH.

DM-RS Enhancement for PDSCH Carrying SIB/RAR/Paging

SDM may not be supported for SIB, random access response (RAR), and/or paging transmissions that are QCL with different SSB block indexes. Without SDM, a UE may not be able to distinguish between the SIB, RAR, and/or paging that are associated with the different SSB block indexes. Aspects presented herein enable SDM for PDSCH carrying SIB, RAR, and/or paging transmissions.

Figure 7:
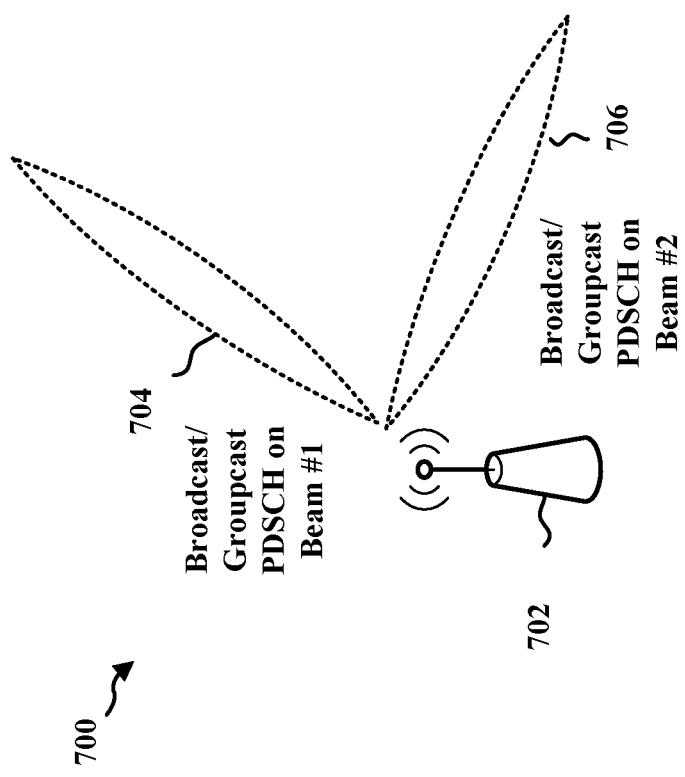
FIG. 7 is an example of broadcasting or groupcasting PDSCH transmissions using SDM.

FIG. 7 illustrates an example 700 of SDM transmission by a base station 702 of multiple broadcast/groupcast PDSCH beams (e.g., PDSCH beam 704 and PDSCH beam 706) that may be transmitted using the same or overlapping time/frequency resources. The PDSCH that is broadcast/groupcast on beam 704 may have a QCL relationship with SSB block of CSI-RS $B_1$, with $B_1$ being an index of the SSB block or CSI-RS. The base station 702 may broadcast/groupcast the PDSCH on beam 704 using DM-RS port 1000 and/or 1002. The base station 702 may broadcast/groupcast the PDSCH on beam 704 using inter-slot or intra-slot repetition and/or frequency hopping. The base station 702 may broadcast/groupcast the PDSCH on beam 704 using a DM-RS sequence scrambling ID that is a function of the SSB block index or the CSI-RS index (e.g., $B_1$).

The PDSCH that is broadcast/groupcast on beam 706 may have a QCL relationship with SSB block of CSI-RS $B_2$, with $B_2$ being an index of the SSB block or CSI-RS. The base station 702 may broadcast/groupcast the PDSCH on beam 706 using DM-RS port 1001 and/or 1003. The base station 702 may broadcast/groupcast the PDSCH on beam 706 using inter-slot or intra-slot repetition and/or frequency hopping. The base station 702 may broadcast/groupcast the PDSCH on beam 706 using a DM-RS sequence scrambling ID that is a function of the SSB block index or the CSI-RS index (e.g., $B_2$).

Figure 8:
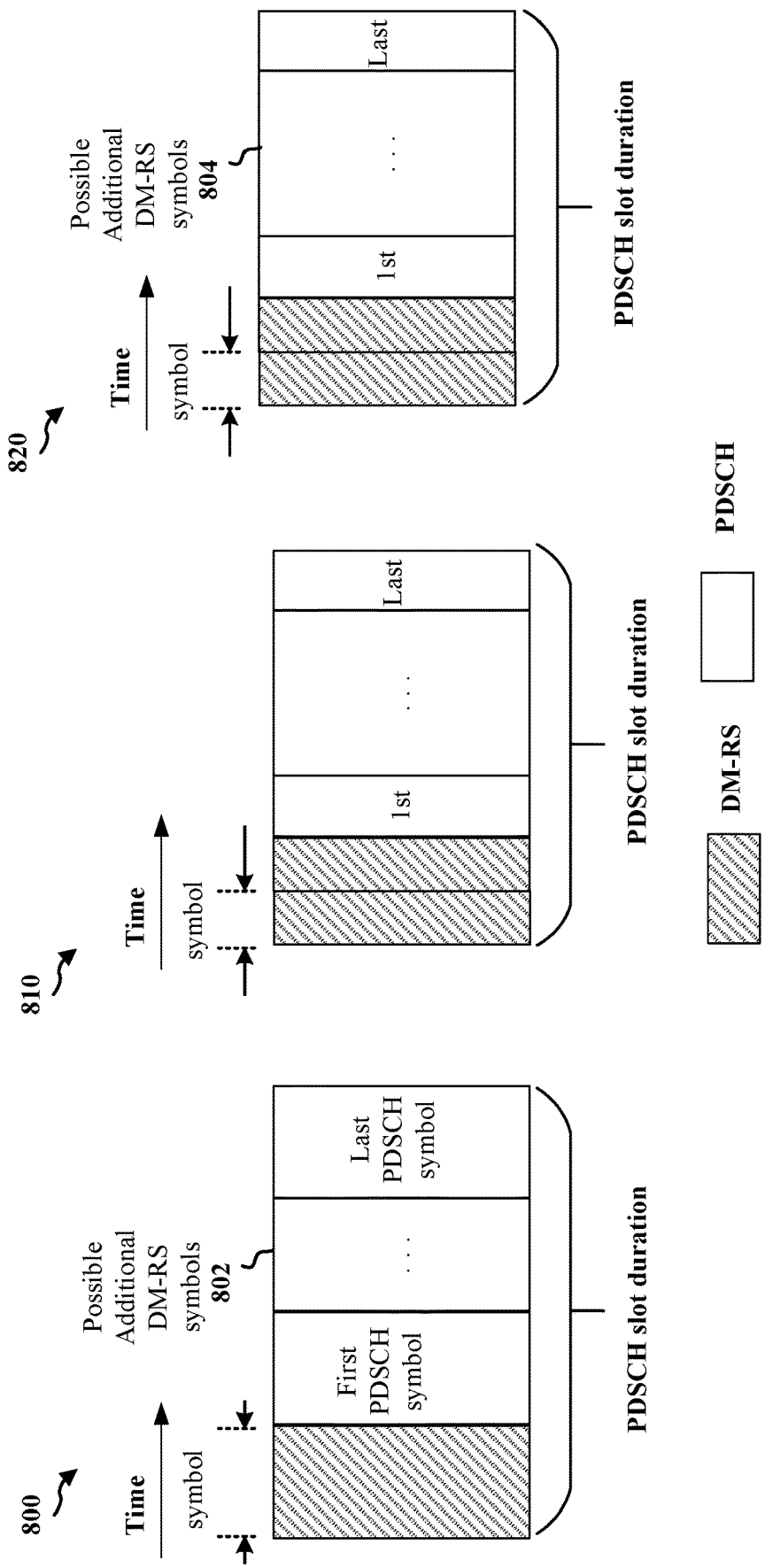
FIG. 8 illustrates example locations for DM-RS symbols in a PDSCH transmission.

Multiple DM-RS symbol configurations may be supported for Type A and/or Type B PDSCH mapping, when the PDSCH carries SIB/RAR/paging. In a first example, the DM-RS symbol locations for the Type-A PDSCH mapping may include a single front-loaded symbol. For example, the DM-RS symbol location may include only a single, front-loaded symbol. FIG. 8 illustrates various examples of DM-RS symbol locations for a PDSCH slot duration of $L_d$ symbols. Example 800 illustrates a single, front-loaded symbol placement of DM-RS based on multiplexing orthogonal antenna ports on a single DM-RS symbol that is front-loaded (e.g., coming at the beginning of a slot, such as following control signaling) for type A/B PDSCH mapping.

In a second example, the DM-RS symbol location may include a front-loaded single-symbol DM-RS and additional DM-RS symbols that are time-interleaved with the PDSCH symbols. Example 800 illustrates that additional symbols of DM-RS 802 may be included. The DM-RS symbol locations may include the additional DM-RS symbols interleaved with the PDSCH symbols based on the PDSCH slot duration, e.g., when the PDSCH slot duration $\geq L_d$ symbols, where $L_d$ is a configurable threshold.

In a third example, the DM-RS symbol locations may include a front-loaded double-symbol DM-RS. Examples 810 and 820 illustrate a double, front-loaded symbol placement of DM-RS based on multiplexing orthogonal antenna ports on double DM-RS symbols that are front-loaded for type A/B PDSCH mapping. The front-loaded double symbol DM-RS may be with or without additional DM-RS symbols that are time-interleaved with the PDSCH symbols. For example, example 810 illustrates a double, front loaded placement of DM-RS without additional DM-RS symbols, and example 820 illustrates a double, front-loaded placement of DM-RS symbols with possible additional DM-RS symbols at 804. The DM-RS symbol locations may include the additional DM-RS symbols interleaved with the PDSCH symbols based on the PDSCH slot duration, e.g., when the PDSCH slot duration $\geq L_d$ symbols, where $L_d$ is a configurable threshold.

In a fourth example, the DM-RS symbol locations for the Type-A PDSCH may partially or fully align with the SSS symbol of a QCL SSB.

In a first example, the DM-RS symbol locations for the Type-B PDSCH mapping may include a single front-loaded symbol. For example, the DM-RS symbol location may include only a single, front-loaded symbol.

In a second example, the DM-RS symbol locations for the Type-B PDSCH mapping may include a front-loaded double-symbol. For example, the front-loaded double symbol DM-RS may be with or without additional DM-RS locations. The front-loaded double-symbol DMRS may be used based on a PDSCH slot duration, e.g., when the PDSCH slot duration $\geq L_d$ symbols. Ld may be a configurable threshold.

In a fourth example, the DM-RS symbol locations for the Type-B PDSCH may partially or fully align with the SSS symbol of a QCL SSB.

The DM-RS configuration(s) for a PDSCH carrying SIB/RAR/paging can be indicated by PBCH, and/or DCI of a GC-PDCCH scheduling the SIB/RAR/paging. In some examples, the DM-RS configuration(s) may be indicated based on a combination of the PBCH and the DCI.

In some examples, the SSB index or SSB group index can be included in the scrambling ID of the DM-RS. The use of the SSB index and/or the SSB group index in the scrambling ID of the DM-RS for the PDSCH may be based on the number of orthogonal ports and/or the number of SDM PDSCH carrying the SIB/RAR/paging. For example, the scrambling ID of the DM-RS for the PDSCH may be based on the SSB index or the SSB group index when the number of orthogonal ports < the number of SDM PDSCH carrying SIN/RAR/paging.

The ability to distinguish between PDSCH carrying SIB/RAR/paging may be limited when receiving the PDSCH scheduled by a particular DCI format (such as DCI format 1_0) or receiving the PDSCH before dedicated higher layer configuration for the UE. In these examples, the DM-RS may be limited to a single port, e.g., port DM-RS 1000 for Type-1 DM-RS configuration. Aspects presented herein enable SDM of the PDSCH carrying the SIB/RAR/paging through the dynamic indication of the DM-RS port index for a broadcast PDSCH scheduled, e.g., by DCI format 1_0.

In some examples, the PDSCH may not be present in a symbol carrying the DM-RS. For example, if a symbol carries the DM-RS, the base station may avoid transmitting the PDSCH in the symbol.

In some examples, the SDM patterns of orthogonal DM-RS ports may be determined using a look up table. The look up table may be defined and may be known by the base station and the UE. Alternately, the look up table may be signaled to the UE from the network.

In some examples, reserved DCI bits, such as reserved bits in DCI format 1_0, may be used to indicate or activate the orthogonal DMRS port index in-use. For example, the DCI may activate ports 1000 to 1003, e.g., when a single-symbol DMRS is supported. The DCI may indicate the presence of other orthogonal DMRS ports, e.g., when a double-symbol DMRS and/or an additional DMRS position is supported.

In some examples, the DM-RS frequency density may be increased for orthogonal DM-RS ports that are QCL with the same SSB block. For example, the base station may transmit another DMRS port 1002, which is on a different comb with DMRS port 1000. The UE may assume that both ports are QCL, e.g., equivalent to a single DMRS port and may use the DM-RS together.

In some examples, an RE-level precoder cycling based open-loop diversity transmission may be supported for the broadcast PDSCH. For example, multiple DM-RS ports, such as both DMRS port 1000 and 1002, may be associated with the same PDSCH. The odd-numbered tones of the symbol may be mapped to the DMRS port 1000 and the even-numbered tones of the symbol may be mapped to the DMRS port 1002

Scrambling Payload of GC-PDCCH and PDSCH

The payload of the GC-PDCCH and/or the PDSCH may be scrambled in order to assist the UE in distinguishing between different GC-PDCCH and PDSCH. For example, a scrambling ID (e.g., $C_{init}$) can be used for scrambling the coded bits of the GC-PDCCH or PDSCH, e.g., in broadcasting or group-casing scenarios. The index of the QCL SSB and/or CSI-RS may be used to determine the scrambling ID for the GC-PDCCH and/or the PDSCH. Aspects of the scrambling ID for the DM-RS, as discussed above, may be re-used in constructing the scrambling ID(s) for the payload of the GC-PDCCH and/or the PDSCH.

Figure 9:
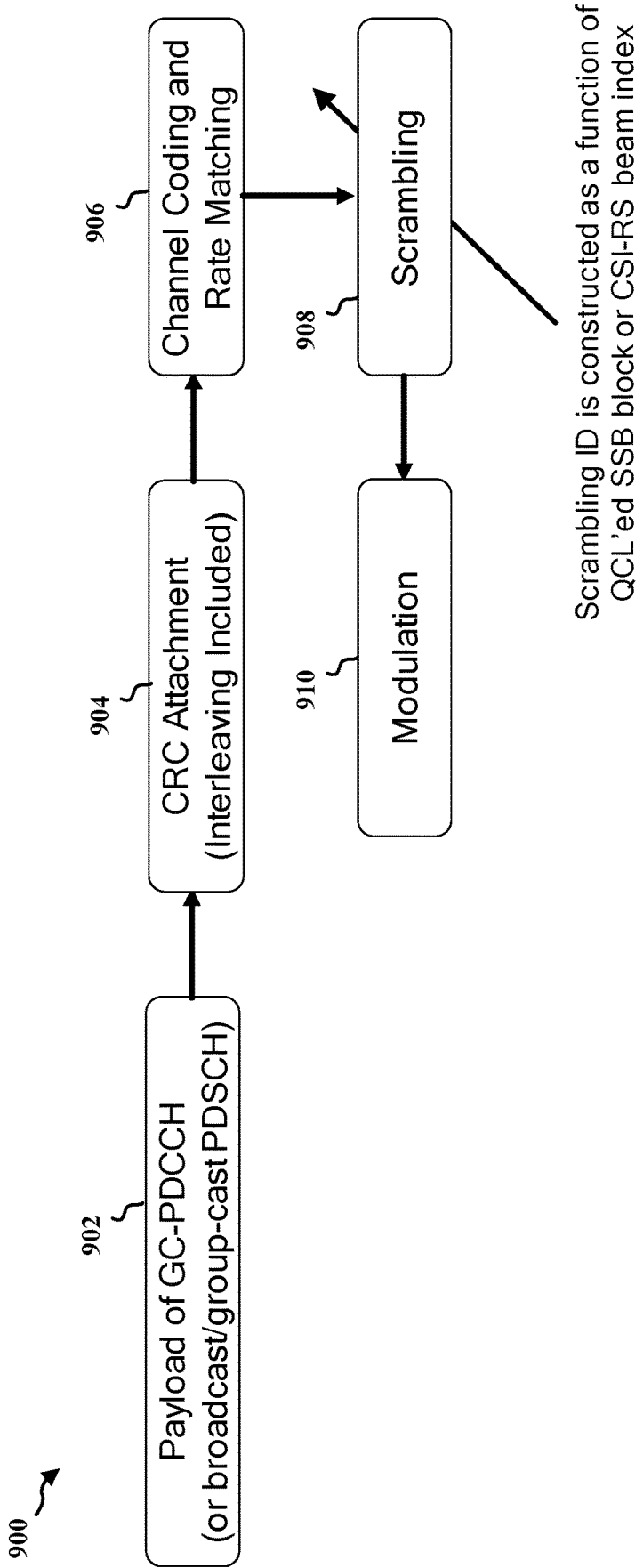
FIG. 9 illustrates aspects of a payload generation for GC-PDCCH or PDSCH transmissions.

FIG. 9 illustrates example 900 aspects of generation of a GC-PDCCH or PDSCH for transmission. At 902, the payload of the GC-PDCCH or the groupcast/broadcast PDSCH is received, and a CRC attachment is added at 904. At 906, channel coding and rate matching is performed. At 908, the GC-PDCCH or PDSCH is scrambled, e.g., with the scrambling ID being constructed as a function of the QCLed SSB block and/or CSI-RS beam index. Then, the GC-PDCCH or PDSCH is modulated, at 910, for transmission.

Figure 10:
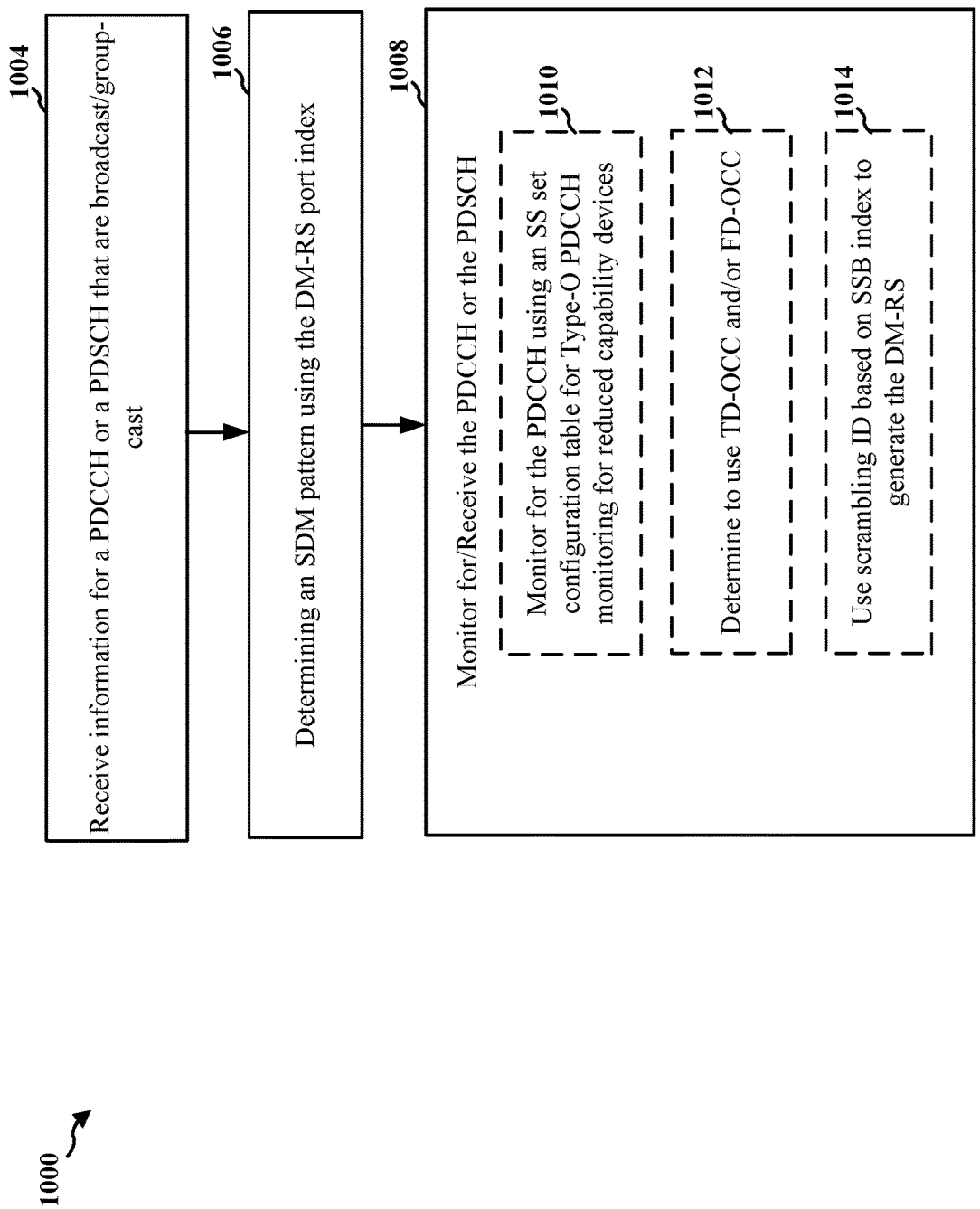
FIG. 10 is a flowchart of a method of wireless communication.

FIG. 10 is a flowchart 1000 of a method of wireless communication. The method may be performed by a UE or a component of a UE (e.g., the UE 140, 350; a processing system, which may include the memory 360 and which may be the entire UE 350 or a component of the UE 350, such as the TX processor 368, the RX processor 356, and/or the controller/processor 359). The method enables improved coverage while balancing throughput for a reduced capability UE.

At 1004, the UE receives information for a PDCCH (e.g., a GC-PDCCH) or a PDSCH, the PDCCH or the PDSCH being broadcast or group-cast by a base station and having have a QCL relationship with an SSB block or a CSI-RS beam. At 1004, the UE receiving the information may include receiving an indication of a configuration for the PDSCH in at least one of a PBCH, DCI of a group common GC-PDCCH scheduling the PDSCH.

A scrambling ID for the DM-RS may be based, at least in part, on a SSB index, a SSB group index, or a CSI-RS beam index. The use of the SSB index or the SSB group index or the CSI-RS beam index in the scrambling ID may be based on a number of orthogonal ports and a number of spatial division multiplexed PDSCH transmissions.

At 1004, the receiving the information may include receiving an indication of a DM-RS port index for the PDSCH scheduled by DCI format 1_0, wherein the UE receives a broadcast comprising the PDSCH using the DM-RS port index. The DM-RS may be received in one or more symbols, and wherein the PDSCH is not present in the one or more symbols in which the DM-RS is received. As illustrated at 1006, the UE may determine an SDM pattern for the PDSCH from a table using the DM-RS port index. The DCI format 1_0 may indicates whether an orthogonal DM-RS port index is activated.

At 1008, the UE monitors for/receives the PDCCH or the PDSCH based on at least one of a SS set configuration enhancement for the PDCCH, a DM-RS resource configuration enhancement for the PDCCH or the PDSCH, or a scrambling identifier set enhancement for payload bits of the PDCCH or the PDSCH, which support SDM with another PDCCH or another PDSCH that are broadcast or group-cast from the base station and have the quasi co-location relationship with a different SSB block or a different CSI-RS beam.

For example, at 1008, the UE may monitor for the broadcast or groupcast PDCCH using a SS set configuration table for Type-0 PDCCH monitoring occasions with at least a set of enhanced configurations for reduced capability devices, e.g., as described in connection with Table 1. The set of enhanced configurations for reduced capability devices may support one or more of: intra-slot or inter-slot repetition for the Type-0 PDCCH, intra-slot or inter-slot frequency hopping for the Type-0 PDCCH, multiple SS sets per slot, and/or indexes for a first symbol of a SS set being quasi-co-located with adjacent SSB indexes being aligned or time-staggered. The set of enhanced configurations may include parameters for one or more of: a repetition level for the PDCCH, a repetition parameter indicating intra-slot repetition or inter-slot repetition, or a frequency hopping parameter indicating whether that frequency hopping is enabled or disabled. The parameters of the set of enhanced configurations may further include one or more of: O, a number of SS sets per slot, M, or a first symbol index for the SS within the slot, e.g., as described in connection with Table 1. A common subset of parameters for higher capability devices and the reduced capabilities devices may be configured with different range of values. The set of enhanced configurations may be for at least one of FR1 or FR2. The set of enhanced configurations may comprise different multiplexing patterns between a SSB and a CORE-SET 0.

The configurations for reduced capability devices may be combined in a combined table with other configurations for higher capability devices. The combined table may add $2^Q$-16 enhanced configurations for reduced capability devices, Q being an integer for which $4<Q\leq6$. The Q bits for the configurations may be mapped to a physical broadcast channel in one or more parts of a MIB or a physical layer payload.

The set of enhanced configurations for reduced capability devices may be in a separate table than the configurations for higher capability devices. The SS set configuration table may include $2^N$ configurations for reduced capability devices, N being an integer for which $3\leq N\leq6$. The N bits for the configurations may be mapped to a physical broadcast channel in one or more parts of a MIB or a physical layer payload.

The PDCCH may comprise a GC-PDCCH whose DM-RS is SDM or CDM with DM-RS resources of other GC-PDCCHs.

The DM-RS of the GC-PDCCHs that are quasi-co-located with different SSB indexes may be transmitted using orthogonal antenna ports. For example, the orthogonal ports for the DM-RS of the GC-PDCCHs may be transmitted using at least one of a FD-OCC or a TD-OCC spanning one or multiple DM-RS symbols. As illustrated at 512, the UE may determine to use one or more of the TD-OCC or the FD-OCC at least based on a CORESET duration. The UE may determine to use the FD-OCC when the CORESET duration comprises a single symbol and determine to use at least one of the FD-OCC or the TD-OCC when the CORE-SET duration comprises multiple symbols.

As illustrated at 514, the UE may use a scrambling ID to generate the DM-RS sequences, wherein the scrambling ID is based, at least in part, on a SSB index of a CSI-RS beam index that is QCL'ed with a corresponding GC-PDCCH. The scrambling ID of the DM-RS sequence may correspond to (e.g., equal) a scrambling ID of a PBCH that is quasi-co-located with the corresponding GC-PDCCH, as described above. The scrambling ID may be based at least in part on a scrambling ID of a PBCH that is quasi-co-located with the corresponding GC-PDCCH, as described above. The scrambling ID may be based on a weighted combination of the SSB block index, a CSI beam index, a slot index, and/or a cell ID, as described above.

The PDSCH that is received, at 1008, may comprise one or more of a SIB, a RAR, or paging and comprises the DM-RS that supports SDM for the PDSCH. For example, the PDSCH may be based on a Type A mapping, and the DM-RS may comprise a single front-loaded DM-RS symbol. The PDSCH may be based on a Type A mapping, and the DM-RS may comprise one front-loaded DM-RS symbol and, if the PDSCH slot duration meets a threshold, one or more additional DM-RS symbols time interleaved with data symbols of the PDSCH. The PDSCH may be based on a Type A mapping, and the DM-RS may comprise multiple front-loaded DM-RS symbols if the PDSCH slot duration meets a threshold. The threshold may be a preconfigured threshold, a defined threshold, or a threshold that is indicated to the UE by the base station. The DM-RS may further comprise one or more additional DM-RS symbols time interleaved with symbols of the PDSCH. The PDSCH may be based on a Type A mapping, and the DM-RS may be at least partially aligned with a SSS symbol of a quasi-co-located SSB or a CSI-RS beam.

Alternately, the PDSCH is based on a Type B mapping, and the DM-RS may comprise a single front-loaded DM-RS symbol. The PDSCH may be based on a Type B mapping, and the DM-RS may comprise multiple front-loaded DM-RS symbols if the PDSCH slot duration meets a threshold. The PDSCH may be based on a Type B mapping, and wherein the DM-RS is at least partially aligned with a SSS symbol of a quasi-co-located SSB or CSI-RS beam.

The UE may receive the DM-RS from orthogonal DM-RS ports that are quasi-co-located with a same SSB index. The DM-RS may use resource element level precoder cycling based on an open-loop diversity transmission for broadcast PDSCH.

In some examples, the PDSCH or the PDCCH, that are received at 1008, may comprise a payload that is scrambled using a scrambling sequence based at least in part on one or more of: an index of a quasi-co-located SSB, an index of a quasi-co-located CSI-RS, or a scrambling ID for a DM-RS associated with the GC-PDCCH or the PDSCH.

Each block in the aforementioned flowchart of FIG. 10 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see 350 of FIG. 3).

Figure 11:
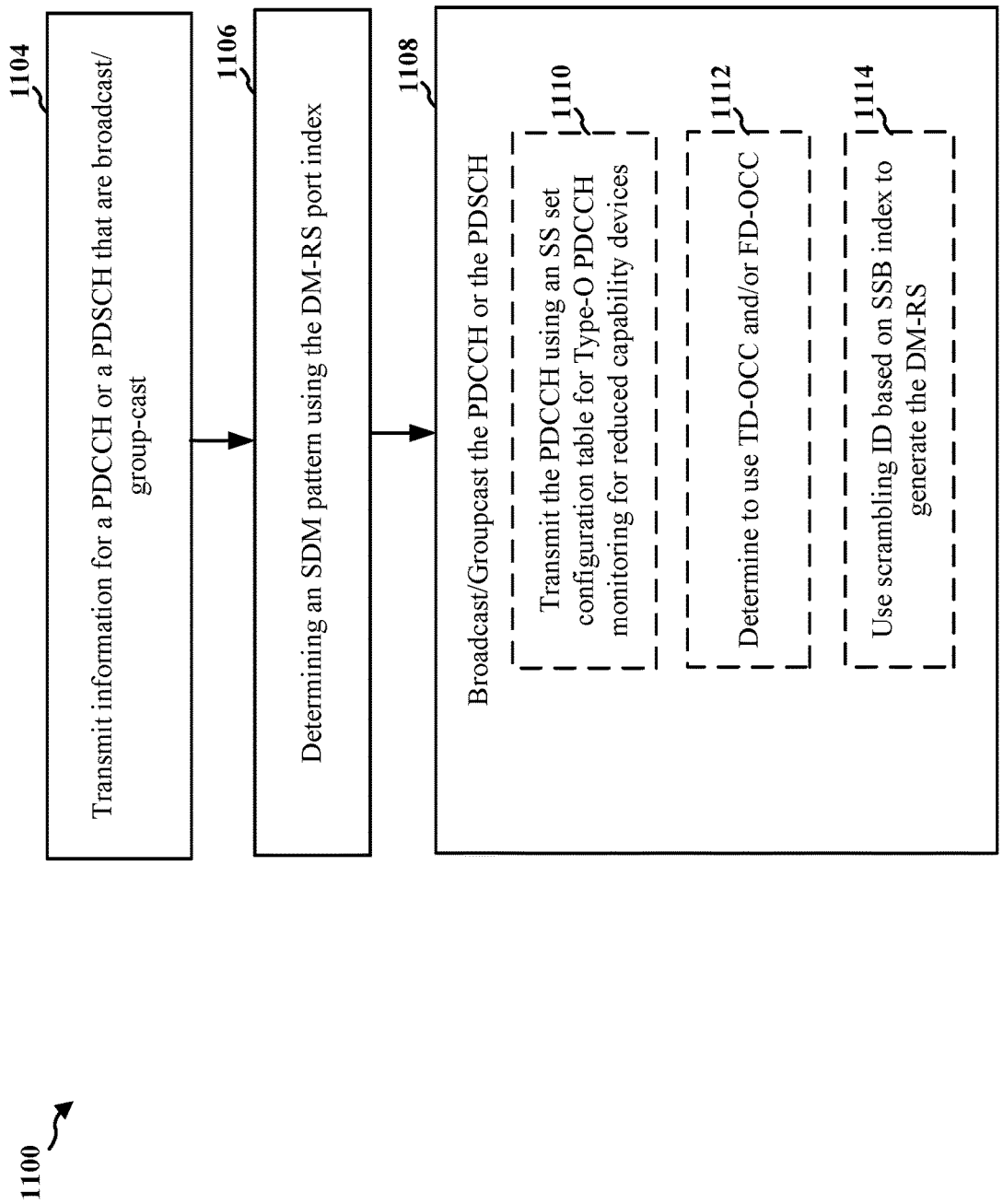
FIG. 11 is a flowchart of a method of wireless communication.

FIG. 11 is a flowchart 1100 of a method of wireless communication. The method may be performed by a base station or a component of a base station (e.g., the base station 102, 180, 310; a processing system, which may include the memory 376 and which may be the entire base station 310 or a component of the base station 310, such as the TX processor 316, the RX processor 370, and/or the controller/processor 375). The method enables improved coverage while balancing throughput for reduced capability UEs.

At 1104, the base station transmits information for a PDCCH or a PDSCH, where the PDCCH or the PDSCH are broadcast or group-cast from the base station and have a QCL relationship with an SSB block or a CSI-RS beam. At 1104, the base station transmitting the information may include transmitting an indication of a configuration for the PDSCH in at least one of a PBCH, DCI of a GC-PDCCH scheduling the PDSCH.

A scrambling ID for the DM-RS may be based, at least in part, on a SSB index, a SSB group index, or a CSI-RS beam index. The use of the SSB index or the SSB group index or the CSI-RS beam index in the scrambling ID may be based on a number of orthogonal ports and a number of spatial division multiplexed PDSCH transmissions.

At 1104, the transmitting the information may include transmitting an indication of a DM-RS port index for the PDSCH scheduled by DCI format 1_0, wherein the base station transmits a broadcast comprising the PDSCH using the DM-RS port index. The DM-RS may be transmitted in one or more symbols, and wherein the PDSCH is not present in the one or more symbols in which the DM-RS is transmitted. As illustrated at 1106, the base station may determine an SDM pattern for the PDSCH from a table using the DM-RS port index. The DCI format 1_0 may indicates whether an orthogonal DM-RS port index is activated.

At 1108, the base station broadcasts or groupcasts the PDCCH or the PDSCH based on at least one of a SS set configuration enhancement for the PDCCH, a DM-RS resource configuration enhancement for the PDCCH or the PDSCH, or a scrambling identifier set enhancement for payload bits of the PDCCH or the PDSCH, which support the SDM with another PDCCH or another PDSCH that are broadcast or group-cast from the same base station and have the quasi co-location relationship with a different SSB block or a different CSI-RS beam.

For example, at 1108, the base station may broadcast or groupcast PDCCH using a SS set configuration table for Type-0 PDCCH monitoring occasions with at least a set of enhanced configurations for reduced capability devices, e.g., as described in connection with Table 1. The set of enhanced configurations for reduced capability devices may support one or more of: intra-slot or inter-slot repetition for the Type-0 PDCCH, intra-slot or inter-slot frequency hopping for the Type-0 PDCCH, multiple SS sets per slot, and/or indexes for a first symbol of a SS set being quasi-co-located with adjacent SSB indexes being aligned or time-staggered. The set of enhanced configurations may include parameters for one or more of: a repetition level for the PDCCH, a repetition parameter indicating intra-slot repetition or inter-slot repetition, or a frequency hopping parameter indicating whether that frequency hopping is enabled or disabled. The parameters of the set of enhanced configurations may further include one or more of: O, a number of SS sets per slot, M, or a first symbol index for the SS within the slot, e.g., as described in connection with Table 1. A common subset of parameters for higher capability devices and the reduced capabilities devices may be configured with different range of values. The set of enhanced configurations may be for at least one of FR1 or FR2. The set of enhanced configurations may comprise different multiplexing patterns between a SSB and a CORESET 0.

The configurations for reduced capability devices may be combined in a combined table with other configurations for higher capability devices. The combined table may add $2^Q$-16 enhanced configurations for reduced capability devices, Q being an integer for which $4<Q\leq 6$. The Q bits for the configurations may be mapped to a physical broadcast channel in one or more parts of a MIB or a physical layer payload.

The set of enhanced configurations for reduced capability devices may be in a separate table than the configurations for higher capability devices. The SS set configuration table may include $2^N$ configurations for reduced capability devices, N being an integer for which $3\leq N\leq 6$. The N bits for the configurations may be mapped to a physical broadcast channel in one or more parts of a MIB or a physical layer payload.

The PDCCH may comprise a GC-PDCCH whose DM-RS is spatial division multiplexed (SDM) or code division multiplexed (CDM) with DM-RS resources of other GC-PDCCHs.

The DM-RS of the GC-PDCCHs that are quasi-co-located with different SSB indexes may be transmitted using orthogonal antenna ports. For example, the orthogonal ports for the DM-RS of the GC-PDCCHs may be transmitted using at least one of a FD-OCC or a TD-OCC spanning one or multiple DM-RS symbols. As illustrated at 612, the base station may determine to use one or more of the TD-OCC or the FD-OCC at least based on a CORESET duration. The base station may determine to use the FD-OCC when the CORESET duration comprises a single symbol and determine to use at least one of the FD-OCC or the TD-OCC when the CORESET duration comprises multiple symbols.

As illustrated at 614, the base station may use a scrambling ID to generate the DM-RS sequences, wherein the scrambling ID is based, at least in part, on a SSB index of a CSI-RS beam index that is QCL'ed with a corresponding GC-PDCCH. The scrambling ID of the DM-RS sequence may correspond to (e.g., equal) a scrambling ID of a PBCH that is quasi-co-located with the corresponding GC-PDCCH, as described above. The scrambling ID may be based at least in part on a scrambling ID of a PBCH that is quasi-co-located with the corresponding GC-PDCCH, as described above. The scrambling ID may be based on a weighted combination of the SSB block index, a CSI beam index, a slot index, and/or a cell ID, as described above.

The PDSCH that is transmitted, at 1108, may comprise one or more of a SIB, a RAR, or paging and comprises the DM-RS that supports SDM for the PDSCH. For example, the PDSCH may be based on a Type A mapping, and the DM-RS may comprise a single front-loaded DM-RS symbol. The PDSCH may be based on a Type A mapping, and the DM-RS may comprise one front-loaded DM-RS symbol and, if the PDSCH slot duration meets a threshold, one or more additional DM-RS symbols time interleaved with data symbols of the PDSCH. The PDSCH may be based on a Type A mapping, and the DM-RS may comprise multiple front-loaded DM-RS symbols if the PDSCH slot duration meets a threshold. The threshold may be a preconfigured threshold, a defined threshold, or a threshold that is indicated to the UE by the base station. The DM-RS may further comprise one or more additional DM-RS symbols time interleaved with symbols of the PDSCH. The PDSCH may be based on a Type A mapping, and the DM-RS may be at least partially aligned with a SSS symbol of a quasi-co-located SSB or a CSI-RS beam.

Alternately, the PDSCH may be based on a Type B mapping, and the DM-RS may comprise a single front-loaded DM-RS symbol. The PDSCH may be based on a Type B mapping, and the DM-RS may comprise multiple front-loaded DM-RS symbols if the PDSCH slot duration meets a threshold. The PDSCH may be based on a Type B mapping, and wherein the DM-RS is at least partially aligned with a SSS symbol of a quasi-co-located SSB or CSI-RS beam.

The base station may transmit the DM-RS from orthogonal DM-RS ports that are quasi-co-located with a same SSB index. The DM-RS may use resource element level precoder cycling based on an open-loop diversity transmission for broadcast PDSCH.

In some examples, the PDSCH or the PDCCH, that are transmitted at 1108, may comprise a payload that is scrambled using a scrambling sequence based at least in part on one or more of: an index of a quasi-co-located SSB, an index of a quasi-co-located CSI-RS, or a scrambling ID for a DM-RS associated with the GC-PDCCH or the PDSCH.

Each block in the aforementioned flowchart of FIG. 6 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see 310 of FIG. 3)

The following examples are illustrative only and aspects thereof may be combined with aspects of other embodiments or teaching described herein, without limitation.

Example 1 is a method of wireless communication at a UE, comprising: receiving information for a PDCCH or a PDSCH, wherein the PDCCH or the PDSCH are broadcast or group-cast from a base station and have a quasi co-location relationship with a SSB block or a CSI-RS beam; and monitoring for or receiving the PDCCH or the PDSCH based on at least one of a SS set configuration enhancement for the PDCCH, a DM-RS resource configuration enhancement for the PDCCH or the PDSCH, or a scrambling identifier set enhancement for payload bits of the PDCCH or the PDSCH, which support SDM with another PDCCH or another PDSCH that are broadcast or group-cast from the base station and have the quasi co-location relationship with a different SSB block or a different CSI-RS beam.

In Example 2, the method of Example 1 further includes that the UE monitors for the PDCCH that is broadcast or groupcast using a SS set configuration table for Type-0 PDCCH monitoring occasions with at least a set of enhanced configurations for reduced capability devices.

In Example 3, the method of Example 1 or Example 2 further includes that the set of enhanced configurations for the reduced capability devices support one or more of: intra-slot or inter-slot repetition for a Type-0 PDCCH, intra-slot or inter-slot frequency hopping for the Type-0 PDCCH, multiple SS sets per slot, or indexes for a first symbol of a SS set being quasi-co-located with adjacent SSB indexes being aligned or time-staggered.

In Example 4, the method of any of Examples 1-3 further includes that the set of enhanced configurations for the reduced capability devices include parameters for one or more of: a repetition level for the PDCCH, a repetition parameter indicating intra-slot repetition or inter-slot repetition, or a frequency hopping parameter indicating whether that frequency hopping is enabled or disabled.

In Example 5, the method of any of Examples 1-4 further includes that the set of enhanced configurations for the reduced capability devices further include one or more of: a slot level offset of a first monitoring occasion, a number of SS sets per slot, an additional parameter relating to the number of SS sets per slot, or a first symbol index for the SS set within the slot.

In Example 6, the method of any of Examples 1-5 further includes that a common subset of parameters for higher capability devices and the reduced capabilities devices is configured with different range of values.

In Example 7, the method of any of Examples 1-6 further includes that the configurations are for at least one of FR1 or FR2.

In Example 8, the method of any of Examples 1-7 further includes that the configurations comprise different multiplexing patterns between a SSB and a CORESET 0.

In Example 9, the method of any of Examples 1-8 further includes that a combined table adds $2^Q$-16 enhanced configurations for the reduced capability devices, wherein Q is an integer for which $4 < Q \leq 6$.

In Example 10, the method of any of Examples 1-9 further includes that Q bits for the configurations are mapped to a physical broadcast channel in one or more parts of a MIB or a physical layer payload.

In Example 11, the method of any of Examples 1-10 further includes that the enhanced configurations for the reduced capability devices are in a separate table than other configurations for higher capability devices.

In Example 12, the method of any of Examples 1-11 further includes that the SS set configuration table includes $2^N$ configurations for the reduced capability devices, N being an integer for which $3 \leq N \leq 6$.

In Example 13, the method of any of Examples 1-12 further includes that N bits for the configurations are mapped to a physical broadcast channel in one or more parts of a MIB or a physical layer payload.

In Example 14, the method of any of Examples 1-13 further includes that the PDCCH is a GC-PDCCH whose DM-RS is SDM or CDM with DM-RS resources of other GC-PDCCHs.

In Example 15, the method of any of Examples 1-14 further includes that the DM-RS of the GC-PDCCHs that are quasi-co-located with different SSB indexes are transmitted using orthogonal antenna ports.

In Example 16, the method of any of Examples 1-15 further includes that the orthogonal antenna ports for the DM-RS of the GC-PDCCHs are transmitted using at least one of a FD-OCC or a TD-OCC spanning one or multiple DM-RS symbols.

In Example 17, the method of any of Examples 1-16 further includes determining to use one or more of the TD-OCC or the FD-OCC at least based on a CORESET duration.

In Example 18, the method of any of Examples 1-17 further includes that the UE determines to use the FD-OCC when the CORESET duration comprises a single symbol and determines to use at least one of the FD-OCC or the TD-OCC when the CORESET duration comprises multiple symbols.

In Example 19, the method of any of Examples 1-18 further includes that using a scrambling ID to generate DM-RS sequences, wherein the scrambling ID is based, at least in part, on a SSB index or CSI-RS beam index that is quasi-co-located with a corresponding GC-PDCCH.

In Example 20, the method of any of Examples 1-19 further includes that the scrambling ID of the DMRS sequence equals a scrambling ID of a PBCH that is quasi-co-located with the corresponding GC-PDCCH.

In Example 21, the method of any of Examples 1-20 further includes that the scrambling ID is based at least in part on a scrambling ID of a PBCH that is quasi-co-located with the corresponding GC-PDCCH.

In Example 22, the method of any of Examples 1-21 further includes that the scrambling ID is based on a weighted combination of the SSB block index or a CSI-beam index, a slot index, and a cell ID.

In Example 23, the method of any of Examples 1-22 further includes that the PDSCH one or more of a SIB, a RAR, or paging and comprises the DM-RS that supports SDM for the PDSCH.

In Example 24, the method of any of Examples 1-23 further includes that the PDSCH is based on a Type A mapping, and wherein the DM-RS comprises a single front-loaded DM-RS symbol.

In Example 25, the method of any of Examples 1-24 further includes that the PDSCH is based on a Type A mapping, and wherein the DM-RS comprises one front-loaded DM-RS symbol and, if the PDSCH slot duration meets a threshold, one or more additional DM-RS symbols time interleaved with data symbols of the PDSCH.

In Example 26, the method of any of Examples 1-25 further includes that the PDSCH is based on a Type A mapping, and wherein the DM-RS comprises multiple front-loaded DM-RS symbols if the PDSCH slot duration meets a pre-configured threshold.

In Example 27, the method of any of Examples 1-26 further includes that the DM-RS further comprises one or more additional DM-RS symbols time interleaved with symbols of the PDSCH.

In Example 28, the method of any of Examples 1-27 further includes that the PDSCH is based on a Type A mapping, and wherein the DM-RS is at least partially aligned with a SSS symbol of a quasi-co-located SSB or CSI-RS beam.

In Example 29, the method of any of Examples 1-28 further includes that the PDSCH is based on a Type B mapping, and wherein the DM-RS comprises a single front-loaded DM-RS symbol.

In Example 30, the method of any of Examples 1-29 further includes that the PDSCH is based on a Type B mapping, and wherein the DM-RS comprises multiple front-loaded DM-RS symbols if the PDSCH slot duration meets a threshold.

In Example 31, the method of any of Examples 1-30 further includes that the PDSCH is based on a Type B mapping, and wherein the DM-RS is at least partially aligned with a SSS symbol of a quasi-co-located SSB or CSI-RS beam.

In Example 32, the method of any of Examples 1-31 further includes receiving an indication of a configuration for the PDSCH in at least one of a PBCH, DCI of a GC-PDCCH scheduling the PDSCH.

In Example 33, the method of any of Examples 1-32 further includes that a scrambling ID for the DM-RS is based, at least in part, on a SSB index, a SSB group index, or CSI-RS beam index.

In Example 34, the method of any of Examples 1-33 further includes that the use of the SSB index or the SSB group index or the CSI-RS beam index in the scrambling ID is based on a number of orthogonal ports and a number of spatial division multiplexed PDSCH transmissions.

In Example 35, the method of any of Examples 1-34 further includes receiving an indication of a DM-RS port index for the PDSCH scheduled by DCI format 1_0; and receiving a broadcast comprising the PDSCH using the DM-RS port index.

In Example 36, the method of any of Examples 1-35 further includes that the DM-RS is received in one or more symbols, and wherein the PDSCH is not present in the one or more symbols in which the DM-RS is received.

In Example 37, the method of any of Examples 1-36 further includes determining an SDM pattern for the PDSCH from a table using the DM-RS port index.

In Example 38, the method of any of Examples 1-37 further includes that the DCI format 1_0 indicates whether an orthogonal DM-RS port index is activated.

In Example 39, the method of any of Examples 1-38 further includes that the UE receives the DM-RS from orthogonal DM-RS ports that are quasi-co-located with a same SSB index.

In Example 40, the method of any of Examples 1-39 further includes that the DM-RS uses resource element level precoder cycling based on an open-loop diversity transmission for broadcast PDSCH.

In Example 41, the method of any of Examples 1-40 further includes that the PDSCH or the PDCCH comprises a payload that is scrambled using a scrambling sequence based at least in part on one or more of: an index of a quasi-co-located SSB, an index of a quasi-co-located CSI-RS beam, a scrambling ID for a DM-RS associated with the GC-PDCCH or the PDSCH.

Example 42 is a device including one or more processors and one or more memories in electronic communication with the one or more processors storing instructions executable by the one or more processors to cause the device to implement a method as in any of Examples 1-41.

Example 43 is a system or apparatus including means for implementing a method or realizing an apparatus as in any of Examples 1-41.

Example 44 is a non-transitory computer readable medium storing instructions executable by one or more processors to cause the one or more processors to implement a method as in any of Examples 1-41.

Example 45 is a method of wireless communication at a base station, comprising: transmitting information for a PDCCH or a PDSCH, wherein the PDCCH or the PDSCH are broadcast or group-cast from the base station and have a quasi co-location relationship with a SSB block or a CSI-RS beam; and broadcasting or groupcasting the PDCCH or the PDSCH based on at least one of a SS set configuration enhancement for the PDCCH, a DM-RS resource configuration enhancement for the PDCCH or the PDSCH, or a scrambling identifier set enhancement for payload bits of the PDCCH or the PDSCH, which support the SDM with another PDCCH or another PDSCH that are broadcast or group-cast from the same base station and have the quasi co-location relationship with a different SSB block or a different CSI-RS beam.

In Example 46, the method of Example 45 further includes that the PDCCH that is broadcast or groupcast based on a SS set configuration table for Type-0 PDCCH monitoring occasions with at least a set of enhanced configurations for reduced capability devices.

In Example 47, the method of Example 45 or 46 further includes that the set of enhanced configurations for the reduced capability devices support one or more of: intra-slot or inter-slot repetition for a Type-0 PDCCH, intra-slot or inter-slot frequency hopping for the Type-0 PDCCH, multiple SS sets per slot, or indexes for a first symbol of a SS set being quasi-co-located with adjacent SSB indexes being aligned or time-staggered.

In Example 48, the method of any of Examples 45-47 further includes that the set of enhanced configurations for the reduced capability devices include parameters for one or more of: a repetition level for the PDCCH, a repetition parameter indicating intra-slot repetition or inter-slot repetition, or a frequency hopping parameter indicating whether that frequency hopping is enabled or disabled.

In Example 49, the method of any of Examples 45-48 further includes that the set of enhanced configurations for the reduced capability devices further include one or more of: a slot level offset of a first monitoring occasion, a number of SS sets per slot, an additional parameter relating to the number of SS sets per slot, or a first symbol index for the SS set within the slot.

In Example 50, the method of any of Examples 45-49 further includes that a common subset of parameters for higher capability devices and the reduced capabilities devices is configured with different range of values.

In Example 51, the method of any of Examples 45-50 further includes that the configurations are for at least one of FR1 or FR2.

In Example 52, the method of any of Examples 45-51 further includes that the configurations comprise different multiplexing patterns between a synchronization signal/PBCH block (SSB) and a CORESET 0.

In Example 53, the method of any of Examples 45-52 further includes that a combined table adds $2^Q$-16 enhanced configurations for the reduced capability devices, wherein Q is an integer for which $4<Q \leq 6$.

In Example 54, the method of any of Examples 45-53 further includes that Q bits for the configurations are mapped to a physical broadcast channel in one or more parts of a MIB or a physical layer payload.

In Example 55, the method of any of Examples 45-54 further includes that the enhanced configurations for the reduced capability devices are in a separate table than other configurations for higher capability devices.

In Example 56, the method of any of Examples 45-55 further includes that the SS set configuration table includes $2^N$ configurations for the reduced capability devices, N being an integer for which $3 \leq N \leq 6$.

In Example 57, the method of any of Examples 45-56 further includes that N bits for the configurations are mapped to a physical broadcast channel in one or more parts of a MIB or a physical layer payload.

In Example 58, the method of any of Examples 45-57 further includes that the PDCCH is a GC-PDCCH whose DM-RS is SDM or CDM with DM-RS resources of other GC-PDCCHs.

In Example 59, the method of any of Examples 45-58 further includes that the DM-RS of the GC-PDCCHs that are quasi-co-located with different SSB indexes are transmitted using orthogonal antenna ports.

In Example 60, the method of any of Examples 45-59 further includes that the orthogonal antenna ports for the DM-RS of the GC-PDCCHs are transmitted using at least one of a FD-OCC or a TD-OCC spanning one or multiple DM-RS symbols.

In Example 61, the method of any of Examples 45-60 further includes determining to use one or more of the TD-OCC or the FD-OCC at least based on a CORESET duration.

In Example 62, the method of any of Examples 45-61 further includes that the base station determines to use the FD-OCC when the CORESET duration comprises a single symbol and determines to use at least one of the FD-OCC or the TD-OCC when the CORESET duration comprises multiple symbols.

In Example 63, the method of any of Examples 45-62 further includes using a scrambling ID to generate DM-RS sequences, wherein the scrambling ID is based, at least in part, on a SSB index or CSI-RS beam index that is quasi-co-located with a corresponding GC-PDCCH.

In Example 64, the method of any of Examples 45-63 further includes that the scrambling ID of the DMRS sequence equals a scrambling ID of a PBCH that is quasi-co-located with the corresponding GC-PDCCH.

In Example 65, the method of any of Examples 45-64 further includes that the scrambling ID is based at least in part on a scrambling ID of a PBCH that is quasi-co-located with the corresponding GC-PDCCH.

In Example 66, the method of any of Examples 45-65 further includes that the scrambling ID is based on a weighted combination of the SSB block index or a CSI-beam index, a slot index, and a cell ID.

In Example 67, the method of any of Examples 45-66 further includes that the PDSCH one or more of a SIB, a RAR, or paging and comprises the DM-RS that supports SDM for the PDSCH.

In Example 68, the method of any of Examples 45-67 further includes that the PDSCH is based on a Type A mapping, and wherein the DM-RS comprises a single front-loaded DM-RS symbol.

In Example 69, the method of any of Examples 45-68 further includes that the PDSCH is based on a Type A mapping, and wherein the DM-RS comprises one front-loaded DM-RS symbol and, if the PDSCH slot duration meets a threshold, one or more additional DM-RS symbols time interleaved with data symbols of the PDSCH.

In Example 70, the method of any of Examples 45-69 further includes that the PDSCH is based on a Type A mapping, and wherein the DM-RS comprises multiple front-loaded DM-RS symbols if the PDSCH slot duration meets a pre-configured threshold.

In Example 71, the method of any of Examples 45-70 further includes that the DM-RS further comprises one or more additional DM-RS symbols time interleaved with symbols of the PDSCH.

In Example 72, the method of any of Examples 45-71 further includes that the PDSCH is based on a Type A mapping, and wherein the DM-RS is at least partially aligned with a SSS symbol of a quasi-co-located SSB or CSI-RS beam.

In Example 73, the method of any of Examples 45-72 further includes that the PDSCH is based on a Type B mapping, and wherein the DM-RS comprises a single front-loaded DM-RS symbol.

In Example 74, the method of any of Examples 45-73 further includes that the PDSCH is based on a Type B mapping, and wherein the DM-RS comprises multiple front-loaded DM-RS symbols if the PDSCH slot duration meets a threshold.

In Example 75, the method of any of Examples 45-74 further includes that the PDSCH is based on a Type B mapping, and wherein the DM-RS is at least partially aligned with a SSS symbol of a quasi-co-located SSB or CSI-RS beam.

In Example 76, the method of any of Examples 45-75 further includes transmitting an indication of a configuration for the PDSCH in at least one of a PBCH, DCI of a GC-PDCCH scheduling the PDSCH.

In Example 77, the method of any of Examples 45-76 further includes that a scrambling ID for the DM-RS is based, at least in part, on a SSB index, a SSB group index, or CSI-RS beam index.

In Example 78, the method of any of Examples 45-77 further includes that the use of the SSB index or the SSB group index or the CSI-RS beam index in the scrambling ID is based on a number of orthogonal ports and a number of spatial division multiplexed PDSCH transmissions.

In Example 79, the method of any of Examples 45-78 further includes transmitting an indication of a DM-RS port index for the PDSCH scheduled by DCI format 1_0, wherein the base station transmits a broadcast comprising the PDSCH using the DM-RS port index.

In Example 80, the method of any of Examples 45-79 further includes that the DM-RS is transmitted in one or more symbols, and wherein the PDSCH is not present in the one or more symbols in which the DM-RS is transmitted.

In Example 81, the method of any of Examples 45-80 further includes determining an
SDM pattern for the PDSCH from a table using the DM-RS port index.

In Example 82, the method of any of Examples 45-81 further includes that the DCI format 1_0 indicates whether an orthogonal DM-RS port index is activated.

In Example 83, the method of any of Examples 45-82 further includes that the base station transmits the DM-RS from orthogonal DM-RS ports that are quasi-co-located with a same synchronization signal block (SSB) index.

In Example 84, the method of any of Examples 45-83 further includes that the DM-RS uses resource element level precoder cycling based on an open-loop diversity transmission for broadcast PDSCH.

In Example 85, the method of any of Examples 45-84 further includes that the PDSCH or the PDCCH comprises a payload that is scrambled using a scrambling sequence based at least in part on one or more of: an index of a quasi-co-located SSB, an index of a quasi-co-located CSI-RS beam, a scrambling ID for a DM-RS associated with the GC-PDCCH or the PDSCH.

Example 86 is a device including one or more processors and one or more memories in electronic communication with the one or more processors storing instructions executable by the one or more processors to cause the device to implement a method as in any of Examples 45-85.

Example 87 is a system or apparatus including means for implementing a method or realizing an apparatus as in any of Examples 45-85.

Example 88 is a non-transitory computer readable medium storing instructions executable by one or more processors to cause the one or more processors to implement a method as in any of Examples 45-85.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving information for a physical downlink control channel (PDCCH) or a physical downlink shared channel (PDSCH), wherein the PDCCH or the PDSCH is broadcast or group-cast from a base station and have a quasi co-location relationship with a synchronization signal/PBCH (SSB) block or a channel state information reference signal (CSI-RS) beam; and
   monitoring for or receiving the PDCCH or the PDSCH based on at least one of a search space (SS) set configuration enhancement for the PDCCH, a demodulation reference signal (DM-RS) resource configuration enhancement for the PDCCH or the PDSCH, or a scrambling identifier set enhancement for payload bits of the PDCCH or the PDSCH, which support spatial division multiplexing (SDM) with another PDCCH or another PDSCH that is broadcast or group-cast from the base station and have the quasi co-location relationship with a different SSB block or a different CSI-RS beam, wherein:
   the PDCCH is a group common physical downlink control channel (GC-PDCCH) whose DM-RS is SDM or code division multiplexed (CDM) with DM-RS resources of other GC PDCCHs.

2. The method of claim 1, wherein the PDCCH is monitored by using a SS set configuration table for Type-0 PDCCH monitoring occasions with at least a set of enhanced configurations for reduced capability devices.

3. The method of claim 2, wherein the set of enhanced configurations for the reduced capability devices support one or more of:
   intra-slot or inter-slot repetition for a Type-0 PDCCH,
   intra-slot or inter-slot frequency hopping for the Type-0 PDCCH,
   multiple SS sets per slot, or
   indexes for a first symbol of a SS set being quasi-co-located with adjacent SSB indexes being aligned or time-staggered.

4. The method of claim 2, wherein the set of enhanced configurations for the reduced capability devices include parameters for one or more of:
   a repetition level for the PDCCH,
   a repetition parameter indicating intra-slot repetition or inter-slot repetition, or
   a frequency hopping parameter indicating whether that frequency hopping is enabled or disabled.

5. The method of claim 4, wherein the set of enhanced configurations for the reduced capability devices further include one or more of:
   a slot level offset of a first monitoring occasion,
   a number of SS sets per slot,
   an additional parameter relating to the number of SS sets per slot, or
   a first symbol index for the SS set within the slot.

6. The method of claim 5, wherein a common subset of parameters for higher capability devices and the reduced capability devices is configured with different range of values.

7. The method of claim 2, wherein at least one of:
   the configurations are for at least one of frequency range 1 (FR1) or frequency range 2 (FR2); or
   the configurations comprise different multiplexing patterns between an SSB and a control resource set 0 (CORESET 0).

8. The method of claim 7, wherein a combined table adds $2^Q$-16 enhanced configurations for the reduced capability devices, wherein Q is an integer for which $4<Q\leq6$.

9. The method of claim 8, wherein Q bits for the set of enhanced configurations are mapped to a physical broadcast channel in one or more parts of a master information block (MIB) or a physical layer payload.

10. The method of claim 2, wherein the set of enhanced configurations for the reduced capability devices are in a separate table than other configurations for higher capability devices.

11. The method of claim 10, wherein the SS set configuration table includes $2^N$ configurations for the reduced capability devices, N being an integer for which $3\leq N\leq6$.

12. The method of claim 11, wherein N bits for the set of enhanced configurations are mapped to a physical broadcast channel in one or more parts of a master information block (MIB) or a physical layer payload.

13. The method of claim 1, wherein the DM-RS of the other GC-PDCCHs that are quasi-co-located with different SSB indexes are transmitted using orthogonal antenna ports.

14. The method of claim 13, wherein the orthogonal antenna ports for the DM-RS of the GC-PDCCHs are transmitted using at least one of a frequency division orthogonal cover code (FD-OCC) or a time division orthogonal cover code (TD-OCC) spanning one or multiple DM-RS symbols.

15. The method of claim 14, further comprising:
   determining to use one or more of the TD-OCC or the FD-OCC at least based on a control resource set (CORESET) duration.

16. The method of claim 15, wherein the UE determines to use the FD-OCC when the CORESET duration comprises a single symbol and determines to use at least one of the FD-OCC or the TD-OCC when the CORESET duration comprises multiple symbols.

17. The method of claim 1, further comprising:
   using a scrambling identifier (ID) to generate DM-RS sequences, wherein the scrambling ID is based, at least in part, on an SSB block index or CSI-RS beam index that is quasi-co-located with a corresponding GC-PDCCH.

18. The method of claim 17, wherein at least one of:
   the scrambling ID of a DMRS sequence equals a scrambling ID of a physical broadcast channel (PBCH) that is quasi-co-located with the corresponding GC-PDCCH;
   the scrambling ID is based at least in part on the scrambling ID of the PBCH that is quasi-co-located with the corresponding GC-PDCCH; or
   the scrambling ID is based on a weighted combination of the SSB block index or a CSI-beam index, a slot index, and a cell ID.

19. The method of claim 1, wherein the PDSCH carries one or more of a system information block (SIB), a random access response (RAR), or paging and comprises the DM-RS that supports the SDM for the PDSCH.

20. The method of claim 19, wherein at least one of:
   the PDSCH is based on a Type A mapping, and wherein the DM-RS comprises a single front-loaded DM-RS symbol;
   the PDSCH is based on the Type A mapping, and wherein the DM-RS comprises one front-loaded DM-RS symbol and, if a PDSCH slot duration meets a threshold, one or more additional DM-RS symbols time interleaved with data symbols of the PDSCH;
   the PDSCH is based on the Type A mapping, and wherein the DM-RS comprises multiple front-loaded DM-RS symbols if the PDSCH slot duration meets a preconfigured threshold;
   the PDSCH is based on the Type A mapping, and wherein the DM-RS is at least partially aligned with a secondary synchronization signal (SSS) symbol of a quasi-co-located SSB or CSI-RS beam;
   the PDSCH is based on a Type B mapping, and wherein the DM-RS comprises the single front-loaded DM-RS symbol;
   the PDSCH is based on the Type B mapping, and wherein the DM-RS comprises the multiple front-loaded DM-RS symbols if the PDSCH slot duration meets the threshold;
   the PDSCH is based on the Type B mapping, and wherein the DM-RS is at least partially aligned with the SSS symbol of the quasi-co-located SSB or the CSI-RS beam;
   a scrambling identifier (ID) for the DM-RS is based, at least in part, on a SSB index, a SSB group index, or CSI-RS beam index;
   the UE receives the DM-RS from orthogonal DM-RS ports that are quasi-co-located with a same SSB index; or
   the DM-RS uses resource element level precoder cycling based on an open-loop diversity transmission for broadcast PDSCH.

21. The method of claim 20, wherein the DM-RS further comprises the one or more additional DM-RS symbols time interleaved with symbols of the PDSCH.

22. The method of claim 20, wherein the use of the SSB index or the SSB group index or the CSI-RS beam index in the scrambling ID is based on a number of orthogonal ports and a number of spatial division multiplexed PDSCH transmissions.

23. The method of claim 20, further comprising:
receiving an indication of a DM-RS port index for the PDSCH scheduled by downlink control information (DCI) format 1_0; and
receiving a broadcast comprising the PDSCH using the DM-RS port index.

24. The method of claim 23, wherein at least one of:
the DM-RS is received in one or more symbols, and wherein the PDSCH is not present in the one or more symbols in which the DM-RS is received; or
the DCI format 1_0 indicates whether an orthogonal DM-RS port index is activated.

25. The method of claim 23, further comprising:
determining an SDM pattern for the PDSCH from a table using the DM-RS port index.

26. The method of claim 19, further comprising:
receiving an indication of a configuration for the PDSCH in at least one of a physical broadcast channel (PBCH), downlink control information (DCI) of a group common physical downlink control channel (GC-PDCCH) scheduling the PDSCH.

27. The method of claim 1, wherein the PDSCH or the PDCCH comprises a payload that is scrambled using a scrambling sequence based at least in part on one or more of:
a first index of a quasi-co-located SSB,
a second index of a quasi-co-located CSI-RS beam, or
a scrambling identifier (ID) for the DM-RS associated with a GC-PDCCH or the PDSCH.

28. A method of wireless communication at a base station, comprising:
transmitting information for a physical downlink control channel (PDCCH) or a physical downlink shared channel (PDSCH), wherein the PDCCH or the PDSCH is are broadcast or group-cast from the base station and have a quasi co-location relationship with a synchronization signal/PBCH (SSB) block or a channel state information reference signal (CSI-RS) beam; and
broadcasting or groupcasting the PDCCH or the PDSCH based on at least one of a search space (SS) set configuration enhancement for the PDCCH, a demodulation reference signal (DM-RS) resource configuration enhancement for the PDCCH or the PDSCH, or a scrambling identifier set enhancement for payload bits of the PDCCH or the PDSCH, which support spatial division multiplexing (SDM) with another PDCCH or another PDSCH that is are broadcast or group-cast from the base station and have the quasi co-location relationship with a different SSB block or a different CSI-RS beam, wherein:
the PDCCH is a group common physical downlink control channel (GC-PDCCH) whose DM-RS is SDM or code division multiplexed (CDM) with DM-RS resources of other GC-PDCCHs.

29. The method of claim 28, wherein the PDCCH that is broadcast or groupcast based on a SS set configuration table for Type-0 PDCCH monitoring occasions with at least a set of enhanced configurations for reduced capability devices.

30. The method of claim 29, wherein at least one of:
the set of enhanced configurations for the reduced capability devices support one or more of:
intra-slot or inter-slot repetition for a Type-0 PDCCH,
intra-slot or inter-slot frequency hopping for the Type-0 PDCCH,
multiple SS sets per slot, or
indexes for a first symbol of a SS set being quasi-co-located with adjacent synchronization signal block (SSB) indexes being aligned or time-staggered;
the set of enhanced configurations for the reduced capability devices include parameters for one or more of:
a repetition level for the PDCCH,
a repetition parameter indicating intra-slot repetition or the inter-slot repetition, or
a frequency hopping parameter indicating whether that frequency hopping is enabled or disabled;
the configurations are for at least one of frequency range 1 (FR1) or frequency range 2 (FR2);
the configurations comprise different multiplexing patterns between a SSB and a control resource set 0 (CORESET 0);
the set of enhanced configurations for the reduced capability devices are in a separate table than other configurations for higher capability devices; or
the PDCCH is a group common physical downlink control channel (GC-PDCCH) whose DM-RS is SDM or code division multiplexed (CDM) with DM-RS resources of other GC-PDCCHs.

31. The method of claim 28, wherein the PDSCH or the PDCCH comprises a payload that is scrambled using a scrambling sequence based at least in part on one or more of:
a first index of a quasi-co-located SSB,
a second index of a quasi-co-located CSI-RS beam, or
a scrambling identifier (ID) for the DM-RS associated with a GC-PDCCH or the PDSCH.

32. A method of wireless communication at a user equipment (UE), comprising:
receiving information for a physical downlink control channel (PDCCH) or a physical downlink shared channel (PDSCH), wherein the PDCCH or the PDSCH is broadcast or group-cast from a base station and have a quasi co-location relationship with a synchronization signal/PBCH (SSB) block or a channel state information reference signal (CSI-RS) beam; and
monitoring for or receiving the PDCCH or the PDSCH based on at least one of a search space (SS) set configuration enhancement for the PDCCH, a demodulation reference signal (DM-RS) resource configuration enhancement for the PDCCH or the PDSCH, or a scrambling identifier set enhancement for payload bits of the PDCCH or the PDSCH, which support spatial division multiplexing (SDM) with another PDCCH or another PDSCH that is broadcast or group-cast from the base station and have the quasi co-location relationship with a different SSB block or a different CSI-RS beam, wherein:
the PDSCH or the PDCCH comprises a payload that is scrambled using a scrambling sequence based at least in part on one or more of:
a first index of a quasi-co-located SSB,
a second index of a quasi-co-located CSI-RS beam, or
a scrambling identifier (ID) for the DM-RS associated with a GC-PDCCH or the PDSCH.

* * * * *